(12) United States Patent
Tanaka

(10) Patent No.: US 8,400,969 B2
(45) Date of Patent: *Mar. 19, 2013

(54) COMMUNICATION METHOD FOR TRANSMITTING MULTIPLE PACKET SIGNALS, AND RADIO APPARATUS AND COMMUNICATION SYSTEM USING THE SAME

(75) Inventor: Yasuhiro Tanaka, Aichi (JP)

(73) Assignee: Hera Wireless S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/027,770

(22) Filed: Feb. 15, 2011

(65) Prior Publication Data

US 2011/0182261 A1 Jul. 28, 2011

Related U.S. Application Data

(62) Division of application No. 11/583,144, filed on Oct. 19, 2006, now Pat. No. 8,009,611.

(30) Foreign Application Priority Data

Oct. 20, 2005 (JP) ................................ 2005-306424
Jan. 11, 2006 (JP) ................................ 2006-003817

(51) Int. Cl.
*H04W 4/00* (2009.01)
(52) U.S. Cl. .......... 370/328; 370/314; 370/334; 455/68; 455/69; 455/101
(58) Field of Classification Search ............... 455/68, 455/69, 101; 370/314, 328, 334
See application file for complete search history.

(56) References Cited

U.S. PATENT DOCUMENTS

| 7,418,050 | B1 * | 8/2008 | Gardner et al. | 375/265 |
| 7,430,168 | B2 * | 9/2008 | Yamaura et al. | 370/230.1 |
| 7,490,022 | B2 * | 2/2009 | Sathe et al. | 702/182 |
| 7,643,453 | B2 * | 1/2010 | Webster et al. | 370/334 |
| 7,680,461 | B2 * | 3/2010 | Takano | 455/69 |

(Continued)

FOREIGN PATENT DOCUMENTS

| JP | 63-234647 | 9/1988 |
| JP | 2001-230754 | 8/2001 |

(Continued)

OTHER PUBLICATIONS

Japanese Office Action, with English translation, issued in Japanese Patent Application No. 2006-003817, mailed Mar. 8, 2011.

(Continued)

*Primary Examiner* — Amancio Gonzalez
(74) *Attorney, Agent, or Firm* — DC Patent Lawyers, PLLC

(57) ABSTRACT

A radio apparatus communicates with a plurality of terminal apparatuses by using a packet signal composed of at least one stream. A control unit divides a certain period into a plurality of partial periods and assigns respectively the plurality of partial periods to the plurality of terminal apparatuses by associating the periods with the terminal apparatuses. The control unit also generates a packet signal for use in control and packet signals for use in inquiry. In so doing, the control unit generates the inquiry packet signals for the plurality of respective terminal apparatuses, as a single packet signal. A baseband processing unit and other units transmit the control packet signal and then transmit the inquiry packet signals, and receive packet signals, containing inquiry results, from the plurality of respective terminal apparatuses.

1 Claim, 17 Drawing Sheets

U.S. PATENT DOCUMENTS

| | | | | |
|---|---|---|---|---|
| 7,693,228 B2 * | 4/2010 | Aldana et al. | ............... | 375/267 |
| 7,697,463 B2 * | 4/2010 | Tanaka | ............... | 370/310 |
| 8,009,611 B2 * | 8/2011 | Tanaka | ............... | 370/328 |
| 2003/0035423 A1 * | 2/2003 | Beckmann et al. | ............... | 370/390 |
| 2007/0223367 A1 * | 9/2007 | Wu et al. | ............... | 370/216 |

FOREIGN PATENT DOCUMENTS

| | | |
|---|---|---|
| JP | 2003-283582 | 10/2003 |
| WO | WO 2005/112355 A1 | 11/2005 |

OTHER PUBLICATIONS

Syed Aon Mujtaba, TGn Sync Additional Material, doc.: IEEE 802.11-05/0193r1, Mar. 16, 2005, URL, https://mentor.ieee.org/802.11/dcn/05/11-05-0193-01-000n-tgnsync-additional-material.ppt.

Coleri, S., et al. "Channel Estimation Techniques Based on Pilot Arrangement in OFDM Systems" IEEE Transaction on Broadcasting, Sep. 2002, vol. 48, No. 3, pp. 223-229.

* cited by examiner

FIG.3A

| L-STF | L-LTF | L-SIG | HT-SIG | HT-STF | HT-LTF | -HT-LTF | HT-LTF | -HT-LTF | DATA 1 |
|---|---|---|---|---|---|---|---|---|---|
| L-STF -50ns | L-LTF -50ns | L-SIG -50ns | HT-SIG -50ns | HT-STF -400ns | HT-LTF -400ns | HT-LTF -400ns | HT-LTF -400ns | HT-LTF -400ns | DATA 2 -400ns |
| L-STF -100ns | L-LTF -100ns | L-SIG -100ns | HT-SIG -100ns | HT-STF -200ns | HT-LTF -200ns | -HT-LTF -200ns | -HT-LTF -200ns | HT-LTF -200ns | DATA 3 -200ns |
| L-STF -150ns | L-LTF -150ns | L-SIG -150ns | HT-SIG -150ns | HT-STF -600ns | HT-LTF -600ns | HT-LTF -600ns | -HT-LTF -600ns | -HT-LTF -600ns | DATA 4 -600ns |

FIG.3B

| L-STF | L-LTF | L-SIG | HT-SIG | HT-STF | HT-LTF | -HT-LTF | HT-LTF | -HT-LTF | DATA 1 |
|---|---|---|---|---|---|---|---|---|---|
| L-STF -50ns | L-LTF -50ns | L-SIG -50ns | HT-SIG -50ns | HT-STF -400ns | HT-LTF -400ns | HT-LTF -400ns | HT-LTF -400ns | HT-LTF -400ns | DATA 2 -400ns |
| L-STF -100ns | L-LTF -100ns | L-SIG -100ns | HT-SIG -100ns | HT-STF -200ns | HT-LTF -200ns | -HT-LTF -200ns | -HT-LTF -200ns | HT-LTF -200ns | DATA 3 -200ns |

FIG.3C

| L-STF | L-LTF | L-SIG | HT-SIG | HT-STF | HT-LTF | HT-LTF | DATA 1 |
|---|---|---|---|---|---|---|---|
| L-STF -50ns | L-LTF -50ns | L-SIG -50ns | HT-SIG -50ns | HT-STF -400ns | HT-LTF -400ns | -HT-LTF -400ns | DATA 2 -400ns |

FIG.6

| HT-STF1 | HT-LTF1 | HT-LTF5 | HT-LTF9 | HT-LTF13 | DATA A |
|---|---|---|---|---|---|
| HT-STF2 -50ns | HT-LTF2 -50ns | HT-LTF6 -50ns | HT-LTF10 -50ns | HT-LTF14 -50ns | DATA B -50ns |
| HT-STF3 -100ns | HT-LTF3 -100ns | HT-LTF7 -100ns | HT-LTF11 -100ns | HT-LTF15 -100ns | DATA C -100ns |
| HT-STF4 -150ns | HT-LTF4 -150ns | HT-LTF8 -150ns | HT-LTF12 -150ns | HT-LTF16 -150ns | DATA D -150ns |

COMMUNICATION METHOD FOR TRANSMITTING MULTIPLE PACKET SIGNALS, AND RADIO APPARATUS AND COMMUNICATION SYSTEM USING THE SAME

RELATED APPLICATIONS

This application is a Divisional of U.S. patent application Ser. No. 11/583,144, filed on Oct. 19, 2006 now U.S. Pat. No. 8,009,611, claiming priority of Japanese Patent Application No. 2005-306424, filed on Oct. 20, 2005 and 2006-003817, filed on Jan. 11, 2006, the disclosures of which Applications are incorporated by reference herein.

BACKGROUND OF THE INVENTION

1. Field of the Invention

The present invention relates to a communication technology, and it particularly relates to a method for transmitting a packet signal composed of multiple subcarriers, and a radio apparatus and a communication system utilizing the same.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been applied to the wireless LAN (Local Area Network) standards such as IEEE802.11a/g and HIPERLAN/2. The packet signals in such a wireless LAN are generally transferred via a time-varying channel environment and are also subject to the effect of frequency selective fading. Hence, a receiving apparatus generally carries out the channel estimation dynamically.

In order for the receiving apparatus to carry out the channel estimation, two kinds of known signals are provided within a packet signal. One is the known signal, provided for all carries in the beginning of the burst signal, which is the so-called preamble or training signal. The other one is the known signal, provided for part of carriers in the data area of the packet signal, which is the so-called pilot signal (See Reference (1) in the following Related Art List, for instance).

RELATED ART LIST (1) Sinem Coleri, Mustafa Ergen, Anuj Puri and Ahmad Bahai, "Channel Estimation Techniques Based on Pilot Arrangement in OFDM Systems", *IEEE Transactions on broadcasting*, vol. 48, No. 3, pp. 223-229, September 2002.

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and packet signals to be transmitted in parallel are set (hereinafter, each of data and the like to be transmitted in parallel in a packet signal is called "stream"). That is, streams up to the maximum number of antennas are set for the communications between the transmitting apparatus and the receiving apparatus so as to improve the data transmission rates.

Moreover, combining this MIMO system with the OFDM modulation scheme results in a higher data transmission rate. In the MIMO system, the data rate can also be adjusted by increasing or decreasing the number of antennas to be used for data communications. Furthermore, the data rate can be adjusted in greater detail by applying the adaptive modulation to the MIMO system. To perform such an adjustment of data rates more reliably, the transmitting apparatus should acquire from the receiving apparatus the information on data rates suited for the radio channel between the transmitting apparatus and the receiving apparatus (hereinafter this information will be referred to as "rate information"). To raise the accuracy of the rate information like this, it is desired that the channel characteristics between a plurality of antennas in the transmitting apparatus and a plurality of antennas contained in the receiving apparatus, respectively, be acquired by the receiving apparatus.

To improve the accuracy of rate information in the above-mentioned requirements, it is necessary that the channel characteristics be acquired with high accuracy. To improve the accuracy in the acquisition of channel characteristics, the transmitting apparatus or the receiving apparatus transmits from all of antennas the known signals for use in channel estimation. Hereinafter, the known signals, for use in channel estimation, assigned to a plurality of streams will be referred to as "training signals" independently of the number of streams to which data are assigned. For example, even though data are assigned to two streams, the training signals are assigned to four streams.

Under these circumstances, the inventor of the present invention came to recognize the following problems to be solved. When the training signals are transmitted, the number of streams containing known signals for use in channel estimation (hereinafter referred to as "channel estimation known signals") differs from that containing data. A known signal for setting AGC (Automatic Gain Control), hereinafter referred to as "AGC known signal", at the receiving side is assigned anterior to the channel estimation known signals. When an AGC known signal is assigned only to a stream where data is assigned, part of the channel estimation known signals is received, in a state where the AGC known signal has not been received, anterior thereto. In particular, when the strength of AGC known signal gets larger at the receiving side, the gain of AGC is set to a value which is large to a certain degree. In so doing, when the strength of channel estimation known signal of a stream where the AGC known signal is not assigned is larger, there is a strong possibility that said channel estimation known signal may be amplified to such a degree that distortion is caused by AGC. As a result thereof, the error in channel estimation based on said channel estimation known signal becomes large.

On the other hand, when an AGC known signal is assigned to a stream where a channel estimation known signal is assigned, the number of streams to which the AGC known signal is assigned differs from the number of streams to which data is assigned. Hence, there is a possibility that the gain set by the AGC known signal is not suitable for the demodulation of data. As a result, the demodulated data are subject to errors. In particular, if the difference between the number of streams to which the channel estimation known signals are assigned and that to which the data are assigned gets larger, these problems to be solved will become more important issues.

When the base station apparatus multiplexes the communication with a plurality of terminal apparatuses, CSMA (Carrier Sense Multiple Access) is carried out. For the purpose of improving the transmission efficiency, one basestation apparatus occupies a frequency band in a predetermined period of time so as to continuously transmit a plurality of packet signals. That is, the base station apparatus specifies, in partial periods of time, the timing at which the signals are to be transmitted to a plurality of terminal apparatuses (hereinafter referred to as "transmit timing") and the timing at which the signals from a plurality of terminal apparatuses are to be received (hereinafter referred to as "receive timing"). Then the base station apparatus informs respectively the plurality of terminal apparatuses of said specification, and each of the plurality of terminal apparatuses carries out a processing in accordance with said specification (hereinafter, such a processing will be referred to as "assignment mode"). Here it is assumed that after a plurality of transmit timings for the plurality of terminals are specified, a plurality of transmit timings are specified consecutively. A terminal apparatus receives a signal at the specified transmit timing. Even if the aforementioned training signals are transmitted under such circumstances, it is still desirable that the degradation of transmission efficiency be prevented.

SUMMARY OF THE INVENTION

The present invention has been made under such circumstances and a general purpose thereof is to provide a radio apparatus that improves the accuracy of channel estimation by restricting the degradation of transmission efficiency at the time of transmitting known signals for use in channel estimation.

In order to solve the above problems, a radio apparatus according to one embodiment of the present invention is a radio apparatus for communicating with a plurality of terminal apparatuses by using a packet signal composed of at least one stream, and the apparatus comprises: an assignment unit which divides a specified period into a plurality of partial periods and assigns the plurality of partial periods respectively to the plurality of terminal apparatuses by associating the periods with the terminal apparatuses; a generation unit which generates a control packet signal containing information on the partial periods assigned to the plurality of respective terminal apparatuses by the assigning unit and which generates check packet signals for which a known signal is assigned to a stream whose number is greater than or equal to the number of streams to which data signal is assigned; and a communication unit including a transmitting means which transmits the check packet signals in the partial period assigned by the assignment unit, after the control packet signal generated by the generation unit has been transmitted, and a receiving means which receives packet signals containing check results from the plurality of respective terminal apparatuses, in the plurality of respective partial periods assigned by the assignment unit. The generation unit generates the check packet signals for the plurality of respective terminal apparatuses, as a single packet signal.

According to this embodiment, the packet signals for use in inquiry (check packet signals) for a plurality of terminal apparatuses can be aggregated, so that the transmission efficiency can be improved as compared with the case when a plurality of check packet signals are transmitted.

The generation unit has a signal requesting a check result, contained in the control packet signal. The generation unit has a signal requesting a check result, contained in the check packet signal. In such cases, the signal requesting a check result is contained in the packet signal, so that the terminal apparatus is instructed to transmit the check result.

When generating the control packet signal, the generation unit may assign information on partial periods in which the check packet signals are to be transmitted, to separate regions for each terminal apparatus, and the generation unit may set the values of the partial periods in which the check packet signals are to be transmitted, to an identical value for the plurality of terminal apparatuses. In such a case, even if information on partial periods in which the check packet signals are to be transmitted is assigned to separate regions for each terminal apparatus, the values of the partial periods in which the check packet signals are to be transmitted are set to an identical value. Hence, the check packet signals may be produced as a single packet signal.

The radio apparatus may further comprise an identifying unit which identifies processing speeds for the plurality of terminal apparatuses, respectively. After assigning a partial period for transmitting the check packet signals in a plurality of partial periods, the assignment unit assigns continuously partial periods for receiving packet signals, containing the check results packet signals, from the plurality of respective terminal apparatuses and then assigns a terminal apparatus, whose processing speed identified by the identifying unit is faster, to an anterior partial period in the continuous partial periods for receiving packet signals. In such a case, a terminal apparatus whose processing rate identified by the identifying unit is faster is assigned to an anterior partial period. Thereby, the period of time until the timing at which a terminal apparatus, whose processing speed is low, is to transmit a packet signal can be made longer.

The identifying unit may include: a measurement unit which measures periods of time from when signals are transmitted from the plurality of respectively terminal apparatuses until when responses to the signals are received; and an execution unit which identifies the processing speeds, based on the periods of time measured by the measurement unit. In this case, the processing rates are measured. Hence, the processing rates can be identified even if there is no signal defined for informing the processing rates is defined.

The identifying unit may include a receiving unit which receives information on the processing speeds from the plurality of respective terminal apparatuses; and an execution unit which identifies the processing speeds, based on the information received by the receiving unit. In such a case, the information on the processing rates is received, so that the processing speeds can be accurately identified.

After transmitting the check packet signals, the communication unit may transmit a packet signal that contains data for at least one of the plurality of terminal apparatuses. In this case, the packet signal can be sent separately.

The radio apparatus may further comprise a decision unit which determines a data rate which is to be commonly used for the plurality of terminal apparatuses, from the check results received by the communication unit. The generation unit may generate packet signals that contain data for the plurality of respective terminal apparatuses and may use the data rate determined by the decision unit, as the data rates for the packet signals. In this case, even if data signals for a plurality of terminal apparatuses are contained in a single packet signal, the adaptive modulation for said packet signal can be executed.

Another embodiment of the present invention relates to a communication method. This method is a method for communicating with a plurality of terminal apparatuses by using a packet signal composed of at least one stream, and the method comprises: dividing a specified period into a plurality of partial periods and assigning the plurality of partial periods respectively to the plurality of terminal apparatuses by associating the periods with the terminal apparatuses; generating a control packet signal containing information on the partial periods assigned to the plurality of respective terminal apparatuses and generating check packet signals for which a known signal is assigned to a stream whose number is greater than or equal to the number of streams to which data signal is assigned; and transmitting the control packet generated by the generating; then transmitting the check packet signals in the partial periods assigned by the assigning, and then receiving packet signals containing check results from the plurality of respective terminal apparatuses, in the plurality of respective partial periods assigned by the assigning. The generating is such that the check packet signals for the plurality of respective terminal apparatuses are generated as a single packet signal.

The generating may have a signal requesting a check result, contained in the control packet signal. The generating may have a signal requesting a check result, contained in the check packet signal. When generating the control packet signal, the generating may be such that information on partial periods in which the check packet signals are to be transmitted, is assigned to the separate regions for each terminal apparatus, and the generating may be such that the values of the partial periods in which the check packet signals are to be transmitted is set to an identical value for the plurality of terminal apparatuses. The method may further comprise identifying processing speeds for the plurality of terminal apparatuses, respectively, wherein the assigning may be such that after a partial period for transmitting the check packet signals in a plurality of partial periods is assigned, partial periods for receiving packet signals, containing the check results packet signals, from the plurality of respective terminal apparatuses are assigned continuously and then a terminal apparatus, whose processing speed identified by the identifying is faster, is assigned to an anterior partial period in the continuous partial periods for receiving packet signals.

The identifying may include: measuring periods of time from when signals are transmitted from the plurality of respectively terminal apparatuses until when responses to the signals are received; and identifying the processing speeds, based on the periods of time measured by the measuring. The identifying may include receiving information on the processing speeds from the plurality of respective terminal apparatuses; and identifying the processing speeds, based on the received information. The transmitting and then receiving may be such that after transmitting the check packet signals, a packet signal that contains data for at least one of the plurality of terminal apparatuses is transmitted. The method may further comprise determining a data rate which is to be commonly used for the plurality of terminal apparatuses, from the check results received by the transmitting and then receiving, wherein the generating may be such that packet signals containing data for the plurality of respective terminal apparatuses are generated and the data rate determined thereby is used as the data rates for the packet signals.

Still another embodiment of the present invention relates to a communication system. This communication system comprises: a plurality of terminal apparatuses; and a base station apparatus which communicates with the plurality of terminal apparatuses by using a packet signal composed of at least one stream. The base station apparatus comprises: an assignment unit which divides a specified period into a plurality of partial periods and assigns the plurality of partial periods respectively to the plurality of terminal apparatuses by associating the periods with the terminal apparatuses; a generation unit which generates a control packet signal containing information on the partial periods assigned to the plurality of respective terminal apparatuses by the assigning unit and which generates check packet signals for which a known signal is assigned to a stream whose number is greater than or equal to the number of streams to which data signal is assigned; and a communication unit including a transmitting means which transmits the check packet signals in the partial period assigned by the assignment unit, after the control packet signal generated by the generation unit has been transmitted and a receiving means which receives packet signals containing check results from the plurality of respective terminal apparatuses, in the plurality of respective partial periods assigned by the assignment unit. The generation unit generates the check packet signals for the plurality of respective terminal apparatuses, as a single packet signal.

It is to be noted that any arbitrary combination of the aforementioned constituting elements, and the implementation of the present invention in the form of a method, an apparatus, a system, a recording medium, a computer program and so forth may also be effective as and encompassed by the embodiments of the present invention.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 3A to 3C show packet formats in a communication system of FIG. 2;

FIG. 6 shows packet formats of a packet signal that is finally transmitted in the communication system of FIG. 2;

DETAILED DESCRIPTION OF THE INVENTION

Figure 1:
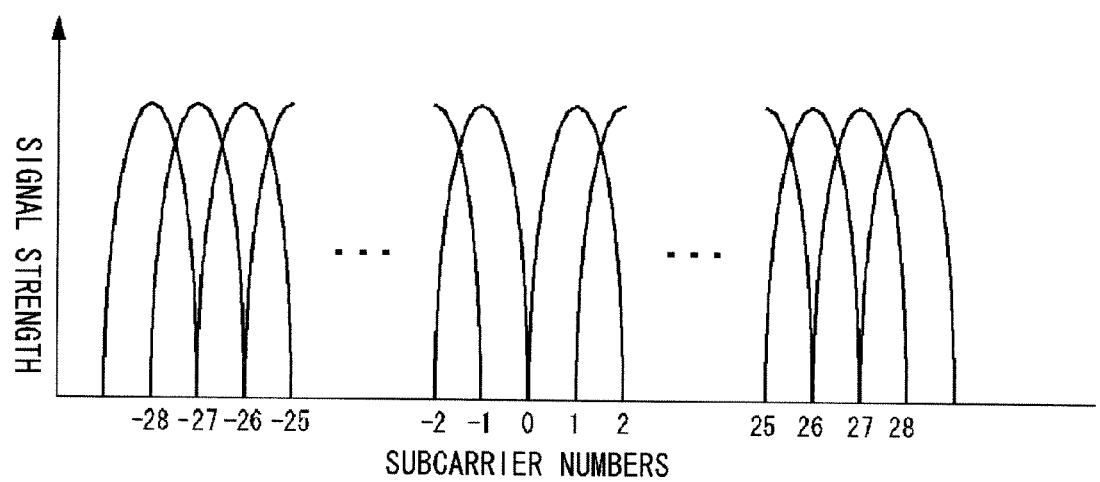
FIG. 1 illustrates a spectrum of a multicarrier signal according to an embodiment of the present invention.

The invention will now be described based on the following embodiments which do not intend to limit the scope of the present invention but exemplify the invention. All of the features and the combinations thereof described in the embodiments are not necessarily essential to the invention.

An outline of the present invention will be given before a specific description thereof. Embodiments of the present invention relate to a MIMO system comprised of at least two radio apparatuses. One of the radio apparatuses corresponds to a base station apparatus whereas the rest thereof correspond to terminal apparatuses. The base station apparatus basically performs CSMA on a plurality of terminal apparatuses. The base station apparatus performs the assignment mode over a certain period of time. Since in the assignment mode the base station apparatus acquires the rate information on a plurality of terminal apparatuses, respectively, the base station apparatus transmits the training signals to the plurality of terminal apparatuses, respectively. In what is to follow, the packet signal to which a training signal is assigned is also referred to as "training signal". On the other hand, if the contents of the training signal are identical, the transmission efficiency in the above processing drops. Accordingly, the following processing will be carried out in the present embodiments. In particular, a description will be given here of a processing carried out when the base station apparatus sends a training signal and receives the rate information. Accordingly, any known technique may be used for the processing of determining the rate information in the terminal apparatuses and the adaptive modulation processing using said rate information, and therefore the description thereof will be omitted here.

When performing the assignment mode, the base station apparatus specifies the transmit timing at the time of sending the training signals and then specifies continuously a plurality of receive timings. Here, the base station apparatus acquires, from packet signals to be received from the plurality of respective receive timings, the rate information corresponding to a plurality of respective terminal apparatuses. The base station apparatus transmits a packet signal, which contains information on the transmit timings and information on the receive timings, in a header portion of the assignment mode (hereinafter, this packet signal will be referred to as "control signal"). Following the control signal, the base station apparatus transmits the training signal and, at the same time, receives the rate information from a plurality of terminal apparatuses. In the control signal, the transmit timings for a plurality of respective terminal apparatuses are assigned to another region. The base station apparatus according to the present embodiment sets the values of a plurality of transmit timings to the same value and thereby the training signals to be transmitted to a plurality of terminal apparatuses are combined together or aggregated into a single training signal. As a result thereof, the transmission efficiency is enhanced.

FIG. 1 illustrates a spectrum of a multicarrier signal according to an embodiment of the present invention. In particular, FIG. 1 shows a spectrum of a signal in the OFDM modulation scheme. One of a plurality of carriers in an OFDM modulation scheme is generally called a subcarrier. Herein, however, a subcarrier is designated by a "subcarrier number". In a MIMO system, 56 subcarriers, namely, subcarrier numbers "−28" to "28" are defined herein. It is to be noted that the subcarrier number "0" is set to null so as to reduce the effect of a direct current component in a baseband signal. On the other hand, 52 subcarriers, namely, subcarrier numbers "−26" to "26" are defined in a system (hereinafter referred to as a "legacy system") which is not compatible with a MIMO system. One example of legacy systems is a wireless LAN complying with the IEEE 802.11a standard. The unit of one signal in the time domain is the unit of one signal composed of a plurality of subcarriers, and this unit will be called "OFDM symbol".

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation), 64-QAM and 256 QAM.

As an error correction scheme, convolutional coding is used for these signals. The coding rates for the convolutional coding are set to ½, ¾ and so forth. The number of data to be transmitted in parallel is set variably. As a result thereof, since the mode of modulation scheme and the values of coding rate and the number of streams are set variably, the data rate is also set variably. It is to be noted that the "data rates" may be determined by arbitrary combination of these factors or by one of them. If the modulation scheme is BPSK and the coding rate is ½ in a legacy system, the data rate will be 6 Mbps. If, on the other hand, the modulation scheme is BPSK and the coding rate is ¾, the date rate will be 9 Mbps.

Figure 2:
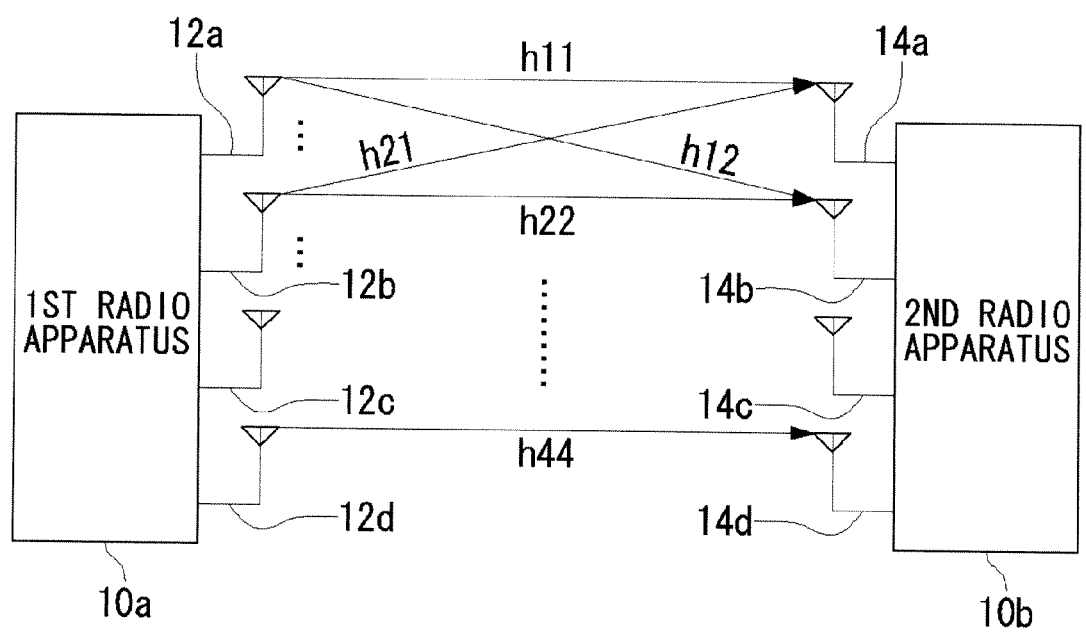
FIG. 2 illustrates a structure of a communication system according to an embodiment of the present invention.

FIG. 2 illustrates a structure of a communication system 100 according to an embodiment of the present invention. The communication system 100 includes a first radio apparatus 10a and a second radio apparatus 10b, which are generically called "radio apparatus 10". The first radio apparatus 10a includes a first antenna 12a, a second antenna 12b, a third antenna 12c and a fourth antenna 12d, which are generically referred to as "antennas 12", and the second radio apparatus 10b includes a first antenna 14a, a second antenna 14b, a third antenna 14c and a fourth antenna 14d, which are generically referred to as "antennas 14". Here, the first radio apparatus 10a corresponds to a transmitting apparatus, whereas the second radio apparatus 10b corresponds to a receiving apparatus.

An outline of a MIMO system will be described as a structure of the communication system 100. Assume herein that data are being transmitted from the first radio apparatus 10a to the second radio apparatus 10b. The first radio apparatus 10a transmits respectively data of a plurality of streams from the first antenna 12a to fourth antenna 12d, respectively. As a result, the data rate becomes higher. The second radio apparatus 10b receives the data of a plurality of streams by the first antenna 14a to fourth antenna 14d. The second radio apparatus 10b separates the received signals through the adaptive array signal processing and demodulates independently the data of a plurality of streams.

Since the number of antennas 12 is "4" and the number of antennas 14 is also "4" here, the number of combinations of channels between the antennas 12 and the antennas 14 is "16". The channel characteristic between from the ith antenna 12$i$ to the jth antenna 14$j$ is denoted by $h_{ij}$. In FIG. 2, the channel characteristic between the first antenna 12a and the first antenna 14a is denoted by $h_{11}$, that between from the first antenna 12a to the second antenna 14b by $h_{12}$, that between the second antenna 12b and the first antenna 14a by $h_{21}$, that between from the second antenna 12b to the second antenna 14b by $h_{22}$, and that between from the fourth antenna 12d to the fourth antenna 14d by $h_{44}$. For the clarity of illustration, the other channels are omitted in FIG. 2. It is assumed here that the training signals are transmitted from the first radio apparatus 10a to the second radio apparatus 10b. Note that the roles of the first radio apparatus 10a and the second radio apparatus 10b may be reversed.

FIGS. 3A to 3C show packet formats in a communication system 100. The packet formats shown in FIGS. 3A to 3C are not the formats of training signals but those of ordinary packet signals. FIG. 3A represents a case where the number of streams is "4", FIG. 3B a case where the number of streams is "3", and FIG. 3C a case where the number of streams is "2". In FIG. 3A, it is assumed that data contained in four streams are to be transmitted, and packet formats corresponding to the first to fourth streams are shown in order from top row to bottom row.

In the packet signal corresponding to the first stream, "L-STF", "HT-LTF" and the like are assigned as preamble signals. "L-STF", "L-LTF", "L-SIG", and "HT-SIG" correspond to a known signal for AGC setting, a known signal for channel estimation and a control signal compatible with a legacy system, and a control signal compatible with a MIMO system, respectively. The control signal compatible with a MIMO system has, for example, information on the number of streams and the destination of data signals. "HT-STF" and "HT-LTF" are a known signal for AGC setting and a known signal, for channel estimation, compatible with a MIMO system, respectively. On the other hand, "DATA 1" is a data signal. Note that L-LTF and HT-LTF are used not only for AGC setting but also for timing estimation.

In the packet signal corresponding to the second stream, "L-STF(−50 ns)", "HT-LTF(−400 ns)" and the like are assigned as preamble signals. In the packet signal corresponding to the third stream, "L-STF(−100 ns)", "HT-LTF(−200 ns)" and the like are assigned as preamble signals. In the packet signal corresponding to the fourth stream, "L-STF(−150 ns)", "HT-LTF(−600 ns)" and the like are assigned as preamble signals.

Here, "−400 ns" and the like indicate the amounts of timing shift in CDD (Cyclic Delay Diversity). The CDD is a processing where in a predetermined interval a time-domain waveform is shifted, by a shift amount, in a posterior direction and then the waveform pushed out of the rearmost part in the predetermined interval is assigned cyclically in a header portion of the predetermined interval. That is, "L-STF(−50 ns)" is "L-STF" given a cyclic timing shift by a delay of −50 ns. Assume herein that L-STF and HT-STF are each structured by a repetition of an 800 ns duration and that the other parts such as HT-LTF and the like are each constituted by a repetition of a 3.2 μs duration. Here, "DATA 1" to "DATA 4" are also subjected to CDD and the amounts of timing shift are of the same values as those for HT-LTFs assigned anterior thereto.

In the first stream, HT-LTFs are assigned in the order of "HT-LTF", "−HT-LTF", "HT-LTF" and "−HT-LTF" from the top. Here, these in this order are called "a first component", "a second component", "a third component" and "a fourth component" in all of the streams. A receiving apparatus extracts a desired signal for the first stream by computing "first component minus (−) second component plus (+) third component minus (−) fourth component" for received signals of all the streams. The receiving apparatus extracts a desired signal for the second stream by computing "first component+second component+third component+fourth component" for received signals of all the streams. Also, the receiving apparatus extracts a desired signal for the third stream by computing "first component−second component−third component+fourth component" for received signals of all the streams. Also, the receiving apparatus extracts a desired signal for the fourth stream by computing "first component+second component−third component−fourth component" for received signals of all the streams. These correspond to the fact that the combination of the signs of predetermined components has an orthogonal relationship among the streams. Note that the addition and subtraction processing are done by vector operation.

As with a legacy system, "52" subcarriers are used for the part from "L-LTF" to "HT-SIG" and so forth. Note that "4" subcarriers out of the "52" subcarriers correspond to pilot signals. On the other hand, the fields from "HT-LTF" and its subsequent parts use "56" subcarriers.

In FIG. 3A, the sign of "HT-LTF" is defined as follows. The signs are arranged in order from the top of the first stream as "+ (plus)", "− (minus)", "+" and "−"; the signs are arranged in order from the top of the second stream as "+", "+", "+" and "+"; the signs are arranged in order from the top of the third stream as "+", "−", "−" and "+"; and the signs are arranged in order from the top of the fourth stream as "+", "+", "−" and "−". However, the signs may be defied as follows. The signs are arranged in order from the top of the first stream as "+", "−", "+" and "+"; the signs are arranged in order from the top of the second stream as "+", "+", "−" and "+"; the signs are arranged in order from the top of the third stream as "+", "+", "+" and "−"; and the signs are arranged in order from the top of the fourth stream as "−", "+", "+" and "+". In such signs, too, the orthogonal relationship holds in the combination of signs of predetermined components.

FIG. 3B corresponds to the first to the third stream of FIG. 3A. FIG. 3C is similar to the first stream and second stream of the packet formats shown in FIG. 3A. Here, the assignment of "HT-LTFs" in FIG. 3C differs from that of "HT-LTFs" in FIG. 3A. That is, there are only the first components and the second components of HT-LTFs. In the first stream, HT-LTFs are assigned in the order of "HT-LTF" and "HT-LTF" from the top thereof whereas in the second stream, HT-LTFs are assigned in the order of "HT-LTF" and "−HT-LTF" from the top thereof. A receiving apparatus extracts a desired signal for the first stream by computing "first component+second component" for received signals of all the streams. Also, the receiving apparatus extracts a desired signal for the second stream by computing "first component−second component" for received signals of all the streams. As described above, these hold the orthogonal relationship between them.

Figure 4A:
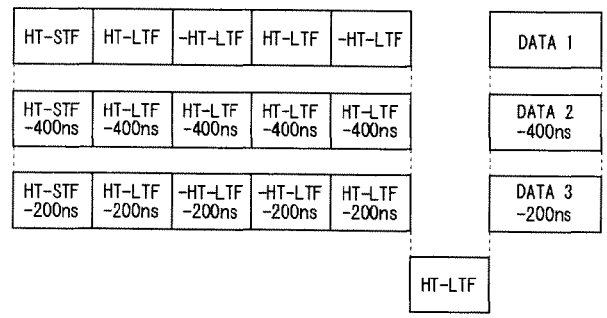
FIGS. 4A to 4D show packet formats for training signals in a communication system of FIG. 2.
Figure 4B:
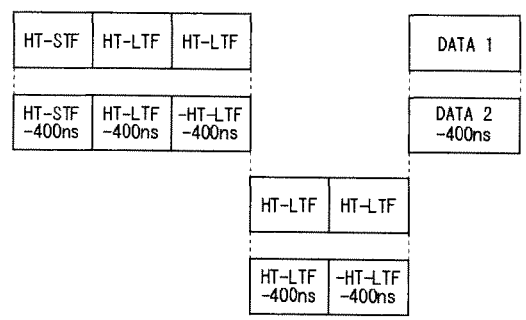

FIGS. 4A to 4D show packet formats for training signals in a communication system 100. FIGS. 4A to 4D are training signals for the packet signals where FIGS. 3B and 3C and data are assigned to one stream. For the clarity of explanation, "L-STF" through "HT-SIG" contained in a packet format are omitted hereinbelow. That is, the structure subsequent to "HT-STF" will be indicated here. FIG. 4A represents a case where the number of streams to which a data signal is assigned (hereinafter such a stream will be referred to "main stream") is "3"; FIG. 4B a case where the number of main streams is "2"; and FIGS. 4C and 4D a case where the number of main streams is "1". That is, a data signal is assigned to each of the first stream to the third stream in FIG. 4A; a data signal is assigned to each of the first stream and the second stream in FIG. 4B; and a data signal is assigned to the first stream in FIGS. 4C and 4D.

The assignment up to HT-LTF in the first stream to the third stream in FIG. 4A is the same as that of FIG. 3B. In a position posterior thereto, however, a blank duration is provided in each of the first stream to the third stream. In the fourth stream, on the other hand, HT-LTF is assigned to the position corresponding to the blank duration in the first to the third streams. And, following the HT-LTF assigned in the fourth stream, data is assigned to each of the first stream to the third stream. One HT-LTF is assigned in the fourth stream.

The assignment as described above makes the number of streams to which "HT-STF" is assigned equal to the number of streams to which a data signal is assigned, so that the error contained in the gain set by "HT-STF" becomes small at a receiving apparatus, thus preventing the worsening of data signal receiving characteristics. Also, since the "HT-LTF" assigned to the fourth stream is only assigned to one stream, the occurrence of a situation can be suppressed where "HT-LTF" assigned to the fourth stream in an receiving apparatus is so amplified as to cause distortion by AGC. Hence, a drop in the accuracy of channel estimation can be prevented.

The assignment up to HT-LTF in the first stream and the second stream in FIG. 4B is the same as that of FIG. 3C. In a position posterior thereto, however, a blank duration is provided in each of the first stream and the second stream. In the third and fourth streams, on the other hand, HT-LTFs are assigned to the position corresponding to the blank duration in the first and second streams. And, following the HT-LTFs assigned in the third and fourth streams, data is assigned to each of the first stream and the second stream. The assignment of HT-LTFs in the third stream and the fourth stream is the same as that of FIG. 3C.

Here it is assumed that the degrees of priority for the amounts of timing shift are defined in the descending order of "0 ns", "−400 ns", "−200 ns" and "−600 ns". In other words, "0 ns" has the highest degree of priority, and "−600 ns" the lowest. Accordingly, the values of "0 ns" and "−400 ns" are used as timing shift amounts in the first stream and the second stream, respectively. In the third stream and the fourth stream, the values of "0 ns" and "−400 ns" are also used as timing shift amounts, respectively. As a result, the combination of "HT-LTF" and "HT-LTF" in the first stream is also used in the third stream, and the combination of "HT-LTF (−400 ns)" and "−HT-LTF (−400 ns)" in the second stream is also used in the fourth stream, thus making the processing simpler.

Figure 4C:
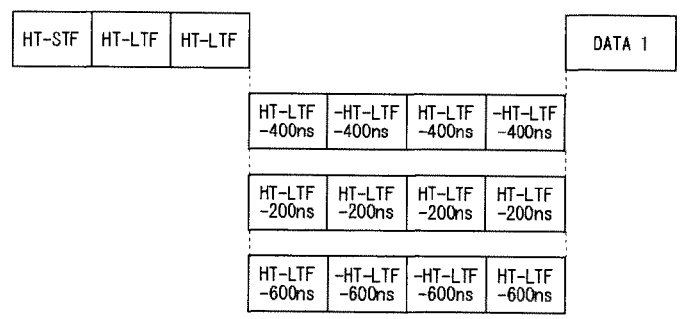

The assignment up to HT-LTF in the first stream in FIG. 4C is equivalent to that for the first stream of FIG. 4B. Here, two "HT-LTFs" are assigned. In a position posterior thereto, however, a blank duration is provided in the first stream. In each of the second to third streams, on the other hand, HT-LTFs are assigned to the position corresponding to the blank duration in the first stream. And, following the HT-LTFs assigned in the second to fourth streams, data is assigned to the first stream. Here, the assignment of HT-LTFs to the second and third streams is similar to that of FIG. 3B.

Figure 4D:
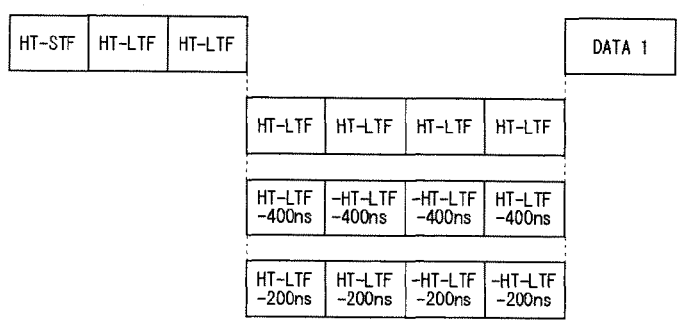

FIG. 4D is structured similarly to FIG. 4C but the combination of signs of "HT-LTF" in FIG. 4D differs from that in FIG. 4C. Here, the combination of signs of "HT-LTF" is defined in a manner such that an orthogonal relationship holds among streams. In FIG. 4D, the combination of signs of "HT-LTF" is so defined as to be fixed for each of a plurality of streams. Similar to FIG. 4C, "0 ns", "−400 ns" and "−200 ns" having high degrees of priority are used even for the second to fourth streams in FIG. 4D.

One "HT-LTF" is assigned to the fourth stream of FIG. 4A, which is a stream to which no data is assigned (hereinafter referred to as "sub-stream"). Two "HT-LTFs" are each assigned to the third stream and the fourth stream of FIG. 4B. Four "HT-LTFs" are each assigned to the second stream to the fourth stream of FIG. 4C and FIG. 4D. Comparing these HT-LTFs, it is found that the length of "HT-LTFs" assigned to the sub-streams in FIG. 4C and FIG. 4D is the longest. That is, the larger the number of main streams in a packet signal where training signals are to be generated, the shorter the length of sub-streams becomes, thus enhancing the transmission efficiency.

FIGS. 5A to 5D show another packet formats for training signals in a communication system 100. FIGS. 5A to 5D correspond respectively to FIGS. 4A to 4D. In FIGS. 5A to 5D, the amounts of timing shift are defined by associating them with a plurality of streams, respectively. Here, the timing shift amount of "0 ns" is defined for the first stream; the timing shift amount of "−400 ns" is defined for the second stream; the timing shift amount of "−200 ns" is defined for the third stream; and the timing shift amount of "−600 ns" is defined for the fourth stream.

Figure 5A:
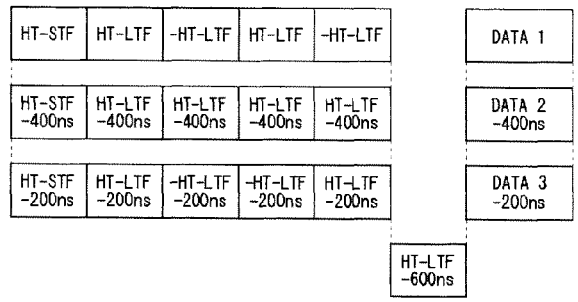
FIGS. 5A to 5D show another packet formats of training signals in a communication system of FIG. 2.
Figure 5B:
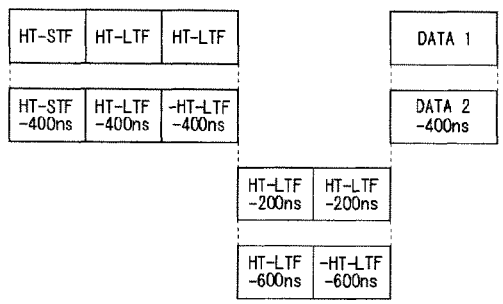
Figure 5C:
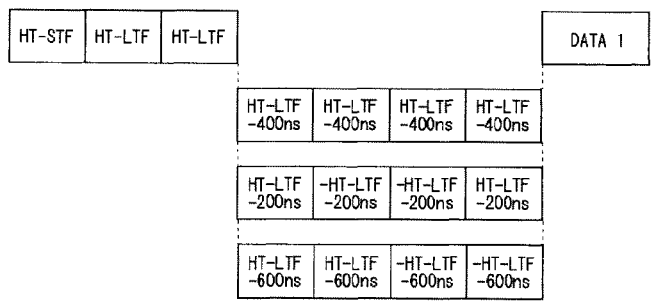
Figure 5D:
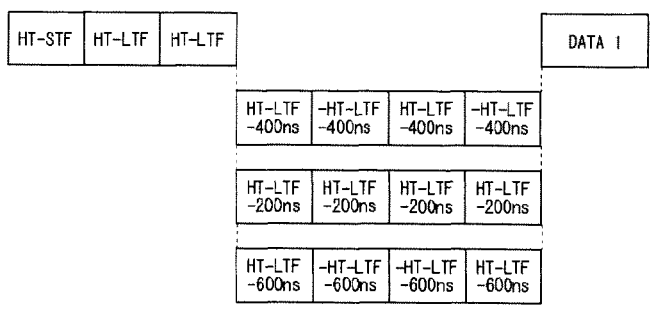

Accordingly, in FIG. 5A "−600 ns" is used instead of the timing shift amount of "0 ns" in the fourth stream of FIG. 4A. In FIG. 5B, "−200 ns" and "−600 ns" are used instead of the timing shift amounts of "0 ns" and "−400 ns" in the third stream and the fourth stream of FIG. 4B, respectively. In FIG. 5C and FIG. 5D, "−400 ns", "−200 ns" and "−600 ns" are used instead of the timing shift amounts of "0 ns", "−400 ns" "−200 ns" in the second stream to the fourth stream of FIG. 4C and FIG. 4D, respectively.

FIG. 5D is structured similarly to FIG. 5C but the combination of signs of "HT-LTF" in FIG. 5D differs from that in FIG. 5C. The combination of signs of "HT-LTF" is given a degree of priority in advance. That is, The degrees of priority are defined in a manner that the degree of priority for the combination of signals of "HT-LTF" in the first stream of FIG. 3A is highest and the degree of priority for the combination of signs of "HT-LTF" in the fourth stream is the lowest. The combination of signs is used sequentially in order from one with the highest degree of priority for the stream where a data signal is assigned, whereas the combination of signs is also used sequentially in order from one with the highest degree of priority for the stream where a data signal is not assigned. In this manner, the same combination of signs is set. Hence, if a receiving apparatus retrieves each component by the calculation of + (plus) and − (minus), a common circuit can be used both in the calculation of channel characteristics for "HT-LTFs" of a stream to which data is not assigned and the calculation of channel characteristics for "HT-LTFs" of a streams to which data is assigned.

FIG. 6 shows packet formats of a packet signal that is finally transmitted in the communication system 100. FIG. 6 corresponds to a modified version of a packet signal of FIG. 4B and FIG. 5B. An operation by orthogonal matrix to be explained later is performed on "HT-STF" and "HT-LTF", which are assigned to the first and second streams of FIG. 4B and FIG. 5B. As a result, "HT-STF1" to "HT-STF4" are generated. The same applies to "HT-LTF" as well. Furthermore, CDD is applied to the first to fourth streams by their respective timing shift amounts of "0 ns", "−50 ns", "−100 ns" and "−150 ns". Note that the absolute value of timing shift amount in the second CDD is so set as to be smaller than the absolute value of timing shift amount in the first CDD for HT-STF and HT-LTF. A similar processing is performed on "HT-LTFs" assigned to the third stream and the fourth stream, and "DATA 1" and the like assigned to the first stream.

Figure 7:
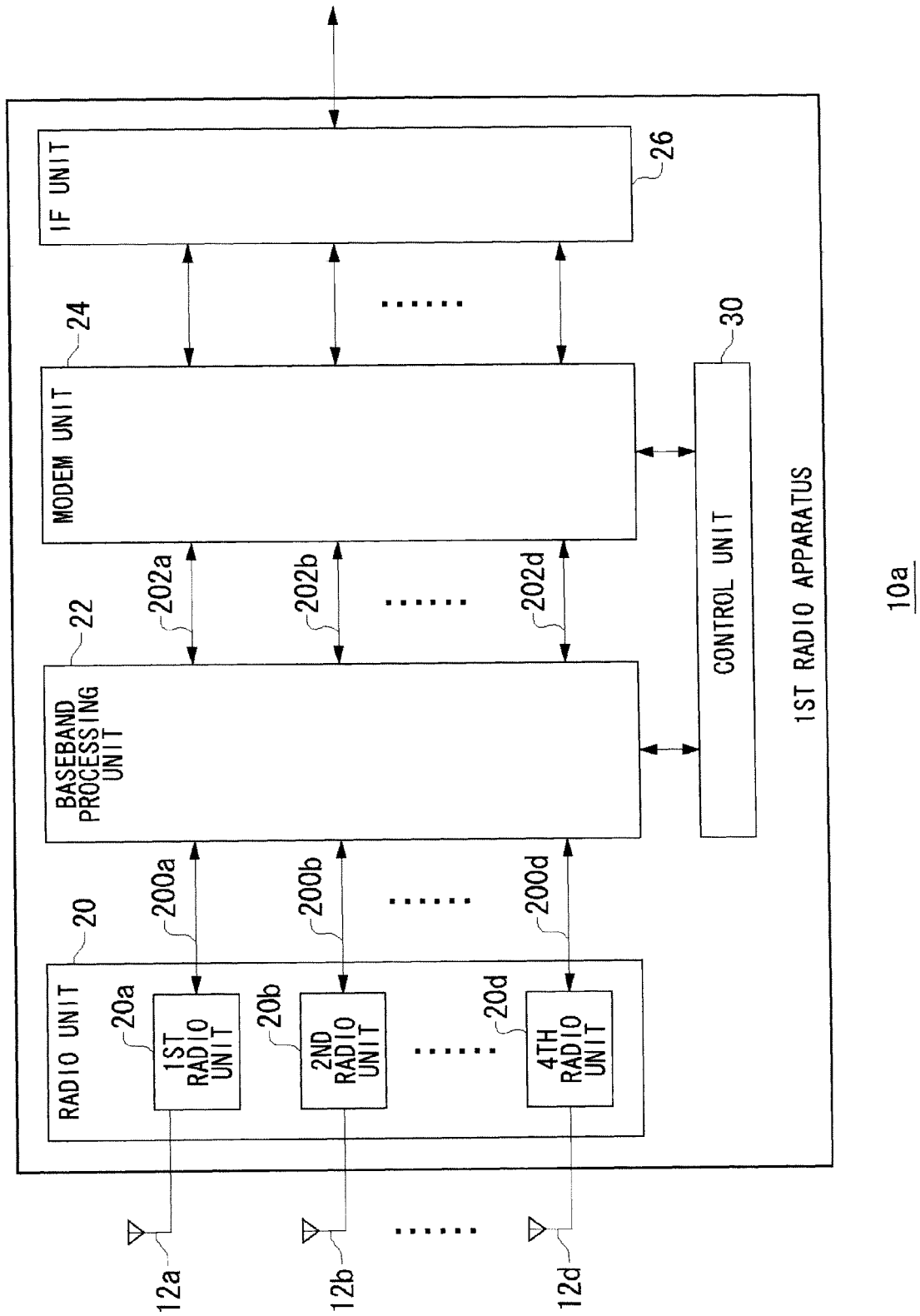
FIG. 7 illustrates a structure of a first radio apparatus shown in FIG. 2.

FIG. 7 illustrates a structure of a first radio apparatus 10a. The first radio apparatus 10a includes a first radio unit 20a, a second radio unit 20b, . . . and a fourth radio unit 20d, which are generically referred to as "radio unit 20", a baseband processing unit 22, a modem unit 24, an IF unit 26 and a control unit 30. Signals involved include a first time-domain signal 200a, a second time-domain signal 200b, . . . and a fourth time-domain signal 200d, which are generically referred to as "time-domain signal 200", and a first frequency-domain signal 202a, a second frequency-domain signal 202b, . . . and a fourth frequency-domain signal 202d, which are generically referred to as "frequency-domain signal 202". Note that the second radio apparatus 10b is structured similarly to the first radio apparatus 10a. Accordingly, in the following description, the description on the receiving operation corresponds to the processing by the second radio apparatus 10b, whereas the description on the transmission operation corresponds to the processing by the first radio apparatus 10a.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included. The AGC unit sets gain in "L-STF" and "HT-STF".

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. That is, the radio unit 20 transmits radiofrequency packet signals from the antennas 12. A PA (Power Amplifier) and a D-A conversion unit are also included. It is assumed herein that the time-domain signal 200 is a multicarrier signal which has been converted to the time domain and is a digital signal.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. One frequency-domain signal 202 corresponds respectively to a plurality of streams transmitted. As a transmission operation, the baseband processing unit 22 inputs, from the modem unit 24, the frequency-domain signals 202 serving as signals in the frequency domain, converts the frequency-domain signals into time domain and then outputs the thus converted signals as time-domain signals by associating them respectively with a plurality of antennas 12.

It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 8:
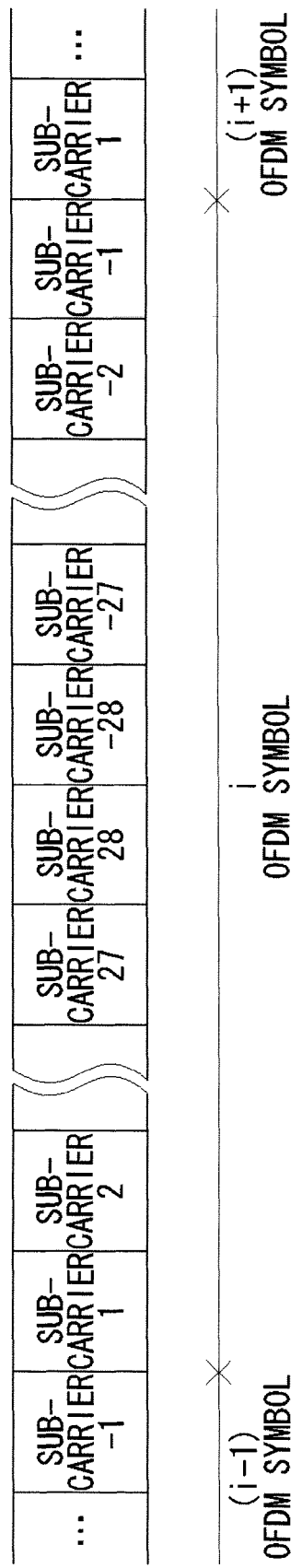
FIG. 8 illustrates a structure of a frequency-domain signal shown in FIG. 7.

FIG. 8 illustrates a structure of a frequency-domain signal. Assume herein that a combination of subcarrier numbers "−28" to "28" shown in FIG. 1 constitutes an "OFDM symbol". An "i"th OFDM symbol is such that subcarrier components are arranged in the order of subcarrier numbers "1" to "28" and subcarrier numbers "−28" to "−1". Assume also that an "(i−1)"th OFDM symbol is placed before the "i"th OFDM symbol, and an "(i+1)"th OFDM symbol is placed after the "i"th OFDM symbol. Note that, in "L-SIG" or the like shown in FIG. 3A or the like, a combination of "−26" to "26" is used for one "OFDM symbol".

Now refer back to FIG. 7. To produce the packet formats corresponding to FIGS. 3A to 3C, FIGS. 4A to 4D and FIGS. 5A to 5D, the baseband processing unit 22 carries out CDD. The baseband processing unit 22 multiplies a steering matrix to achieve the deformed or modified packet format as shown in FIG. 6. Such processing will be discussed later.

As a receiving processing, the modem unit 24 demodulates and deinterleaves the frequency-domain signal 202 outputted from the baseband processing unit 22. The demodulation is carried out per subcarrier. The modem unit 24 outputs the demodulated signal to the IF unit 26. As a transmission processing, the modem unit 24 carries out interleaving and modulation. The modem unit 24 outputs the modulated signal to the baseband processing unit 22 as a frequency-domain signal 202. When the transmission processing is carried out, the modulation scheme is specified by the control unit 30.

As a receiving processing, the IF unit 26 combines signals outputted from a plurality of modem units 24 and then forms one data stream. The IF unit 26 decodes the one data stream. The IF unit 26 outputs the decoded data stream. As a transmission processing, the IF unit 26 inputs one data stream, then codes it and, thereafter, separates the coded data stream. Then the IF unit 26 outputs the thus separated data to the plurality of modem units 24. When the transmission processing is carried out, the coding rate is specified by the control unit 30. Here, an example of the coding is convolutional coding, whereas an example of decoding is Viterbi decoding.

The control unit 30 controls the timing and the like of the first radio apparatus 10a. The control unit 30 performs CSMA when multiplexing a plurality of terminal apparatuses. Since CSMA is a conventional technique, the description thereof is omitted here. In addition to CSMA, the control unit 30 performs an assignment mode. This assignment mode is performed for a certain period of time. Before performing an assignment mode, the control unit 30 notifies a plurality of terminal apparatuses of the start of an assignment mode via the baseband processing unit 22 or the like. Terminal apparatuses that receive the notification include not only terminal apparatuses involved in the assignment mode but also those not involved in the assignment mode.

In the assignment mode, the control unit 30 transmits a control signal at a header portion. Following the control signal, training signals are transmitted to a plurality of terminal apparatuses. That is, the control unit 30 assigns partial periods for transmitting signals, to a plurality of terminal apparatuses. The partial period may be indicated in manner that a period for each terminal apparatus is separately indicated or the period for a plurality of terminal apparatuses is collectively indicated. However, in what is to follow they will be used with no distinction therebetween.

Subsequent to the partial periods for transmitting the signals, the control unit 30 assigns partial periods for receiving the signals, from a plurality of terminal apparatuses, respectively. In a partial period assigned thereto, a terminal apparatus transmits packet signals to the first radio apparatus 10a. That is, a plurality of packets are transmitted continuously from a plurality of terminal apparatuses.

In order to execute the above operation, the control unit 30 partitions a certain period into a plurality of partial periods, and assigns the plurality of partial periods respectively to a plurality of terminal apparatuses by associating the partial periods with the terminal apparatuses. The control unit 30 produces control signals and training signals via the modem unit 24 and the baseband processing unit 22. As discussed above, a control signal contains transmit timings and receive timings assigned respectively to a plurality of terminal apparatuses. And in a training signal, "HT-LTF" and the like are assigned to streams the number of which is greater than the number of streams to which data is assigned. Note that, in a control signal, transmit timings at which the training signals are to be transmitted are arranged in separate regions for each of the terminal apparatuses.

The control unit 30 generates the training signals for a plurality of respective terminal apparatuses, as one packet signal. Accordingly, the control unit 30 sets the values of transmit timings at which the training signals are to be transmitted for a plurality of terminals, to an identical value. The control unit 30 has a signal indicating a request for rate information, contained in a control signal or training signal. After having the modem unit 24, the baseband processing unit 22 and the radio unit 20 transmit the control signal, the control unit 30 has them transmit the training signals at transmit timings. The control unit 30 also has the radio unit 20, baseband processing unit 20 and modem unit 24 receive from a plurality of respective terminal apparatuses the packet signals containing the rate information.

A description will now be given of generating the training signals. The control unit 30 produces packet signals of packet formats as shown in FIGS. 3A to 3C, FIGS. 4A to 4D and FIGS. 5A to 5D in cooperation with the IF unit 26, the modem unit 24 and the baseband processing unit 22, and executes a control to transmit the produced packet signals. Though a description will be given centering around a processing for generating the packet formats shown in FIG. 5B, the same processing will be carried out for the other packet formats.

Data to be assigned to at least one of multiple streams is inputted to the IF unit 26. Here, data to be assigned to two streams are inputted as in the case of FIG. 4B and FIG. 5B. The control unit 30 instructs the baseband processing unit 22 that packet signals be generated from "HT-STFs" assigned to the streams to which the inputted data are assigned, namely the first and the second stream, "HT-LTFs" assigned posterior thereto in a plurality of streams, and DATA assigned to the first and the second stream. The control unit 30 outputs to the baseband processing unit 22 an instruction such that "L-STF", "L-LTF", "L-SIG" and "HT-SIG" be assigned anterior to HT-STF as shown in FIGS. 3A to 3C.

Here, as shown in FIG. 4B and FIG. 5B, two "HT-LTFs" are assigned to each stream. That is, the whole of "HT-LTFs" is formed by repeating "HT-LTF" in the time domain. A combination of signs of "HT-LTF" is defined in a manner such that an orthogonal relationship holds among main streams or sub-streams. As a result, as mentioned above, HT-LTF for the first stream is extracted if the first component and the second component are added together in the main stream. Also, HT-LTF for the second stream is extracted if the second component is subtracted from the first stream in the main stream.

The number of "HT-LTFs" assigned to each stream is determined by the number thereof required for the orthogonality to hold. Accordingly, if the number of streams required for the orthogonal relationship to hold is "2", the number of "HT-LTFs" for each stream will be "2". If, on the other hand, the number of streams required for the orthogonality to hold is "3" or "4", the number of "HT-LTFs" for each stream will be "4".

The control unit 30 has the baseband processing unit 22 apply CDD to HT-LTF and the like. CDD means that HT-LTF assigned to one stream is used as a reference or benchmark and then HT-LTFs assigned to the other streams undergo timing shifts within HT-LTF. The control unit 30 sets up beforehand a degree of priority for the amounts of timing shift. Here, as described earlier, "0 ns" has the highest degree of priority, and following this the degrees of priority for the amounts of timing shift are defined in the descending order of "−400 ns", "−200 ns" and "−600 ns".

Further, the control unit 30 has the baseband processing unit 22 use the timing shift amounts in the descending order of degrees of priority for the main streams. For example, "0 ns" is used for the first stream and "−400 ns" is used for the second stream in the case of FIG. 4B. Also, the control unit 30 has the baseband processing unit 22 use the timing shift amounts in the descending order of degrees of priority for the sub-streams. For example, "0 ns" is used for the third stream and "−400 ns" is used for the fourth stream in the case of FIG. 4B. The above processing produces the packet signals having the packet format as shown in FIG. 4B.

Aside from this, different values of timing shift amounts may be set respectively to a plurality of streams. For example, "0 ns" is set as the timing shift amount for the first stream; "−400 ns" is set as the timing shift amount for the second stream; "−200 ns" is set as the timing shift amount for the third stream; and "−600 ns" is set as the timing shift amount for the fourth stream. The above processing produces the packet signals of the packet format as shown in FIG. 5B.

With the above-described processing, after producing the packet signals of the packet format as shown in FIGS. 4A to 4D and FIGS. 5A to 5D, the control unit 30 has the baseband processing unit 22 modify or deform such packet signals as these. And the control unit 30 has it transmit the modified packet signals to the radio unit 20. That is, the control unit 30 modifies or deforms the packet format as shown in FIG. 4B and FIG. 5B to the packet format as shown in FIG. 6. After extending the number of streams to the number of multiple streams, the baseband processing unit 22 applies CDD to the thus extended streams.

On the other hand, the receiving apparatuses, namely the terminal apparatuses receive packet signals from the transmitting apparatus, namely the base station apparatus. The receiving apparatus estimates channel characteristics between the receiving apparatus itself and the transmitting apparatus, from HT-LTF contained in the received packet signals. The channel characteristics are derived by calculating correlation between HT-LTF contained in the packet signals and the HT-LTF stored in the receiving apparatus, for example. Also, the channel characteristics are derived for each path or stream, as shown in FIG. 2. Accordingly, the channel characteristics are generally expressed as a matrix. The receiving apparatus generates rate information from the thus derived channel characteristics and conveys the rate information to the transmitting apparatus. Based on the information rate received, the control unit 30 in the transmitting apparatus has the modem unit 24 set a modulation scheme. Based on the rate information received, the control unit 30 has the baseband processing unit 22 set the number of streams and has the IF unit 26 set a coding rate.

In terms of hardware, this structure described as above can be realized by a CPU, a memory and other LSIs of an arbitrary computer. In terms of software, it can be realized by memory-loaded programs which have communication functions and the like, but drawn and described herein are function blocks that are realized in cooperation with those. Hence, it is understood by those skilled in the art that these function blocks can be realized in a variety of forms such as by hardware only, software only or the combination thereof.

Figure 9:
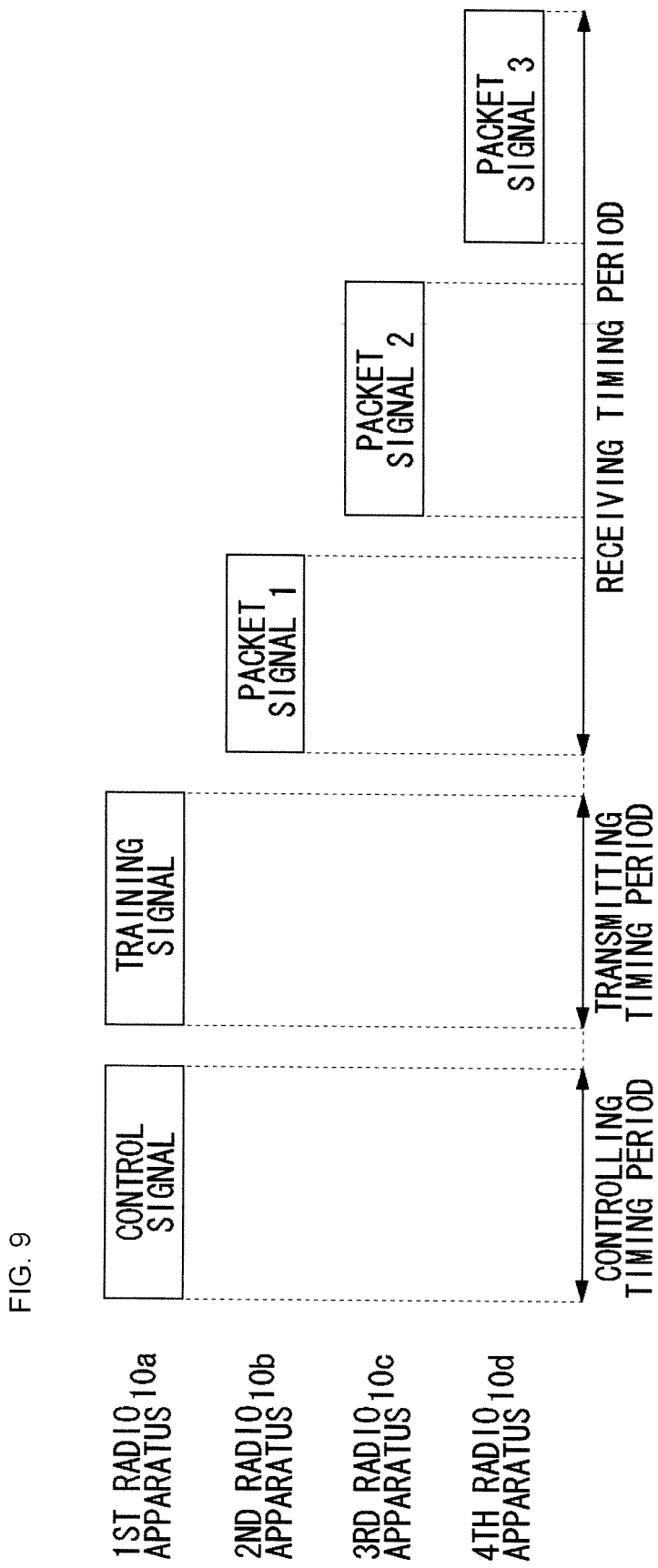
FIG. 9 illustrates a general outline of timing assignment in a control unit shown in FIG. 7.

FIG. 9 illustrates a general outline of timing assignment in the control unit 30. FIG. 9 shows timings assigned by the control unit 30 shows transmit timings of packet signals by the first radio apparatus 10a to the fourth radio apparatus 10d. The transmit timings of packet signals by the second radio apparatus 10b to the fourth radio apparatus 10d are indicated as the receive timing in the first radio apparatus 10a. Here, a description is given centering around the processing in the first radio apparatus 10a, and "controlling timing period", "transmitting timing period" and "receiving timing period" are arranged in this order. Here, the first radio apparatus 10a corresponds to a base station apparatus, whereas the second radio apparatus 10b to the fourth radio apparatus 10d correspond to the terminal apparatuses.

The control unit 30 transmits control signals in a controlling timing period. In a transmitting timing period, the control unit 30 assigns transmit timings to the "training signals". Here, the "training signals" have the packet formats shown in FIGS. 4A to 4D and FIGS. 5A to 5D, respectively.

In a receiving timing period, the control unit 30 assigns receive timings to the second radio apparatus 10b to the fourth radio apparatus 10d, respectively. That is, the control unit 30 assigns "packet signal 1", which is a packet signal from the second radio apparatus 10b, to a header of the receiving timing period. Subsequent to this, the control unit 30 assigns "packet signal 2", which is a packet signal from the third radio apparatus 10c. Finally, the control unit 30 assigns "packet signal 3", which is a packet signal from the fourth radio apparatus 10d. Note that the rate information is contained in "first packet signal 1" to "packet signal 3".

Figure 10:
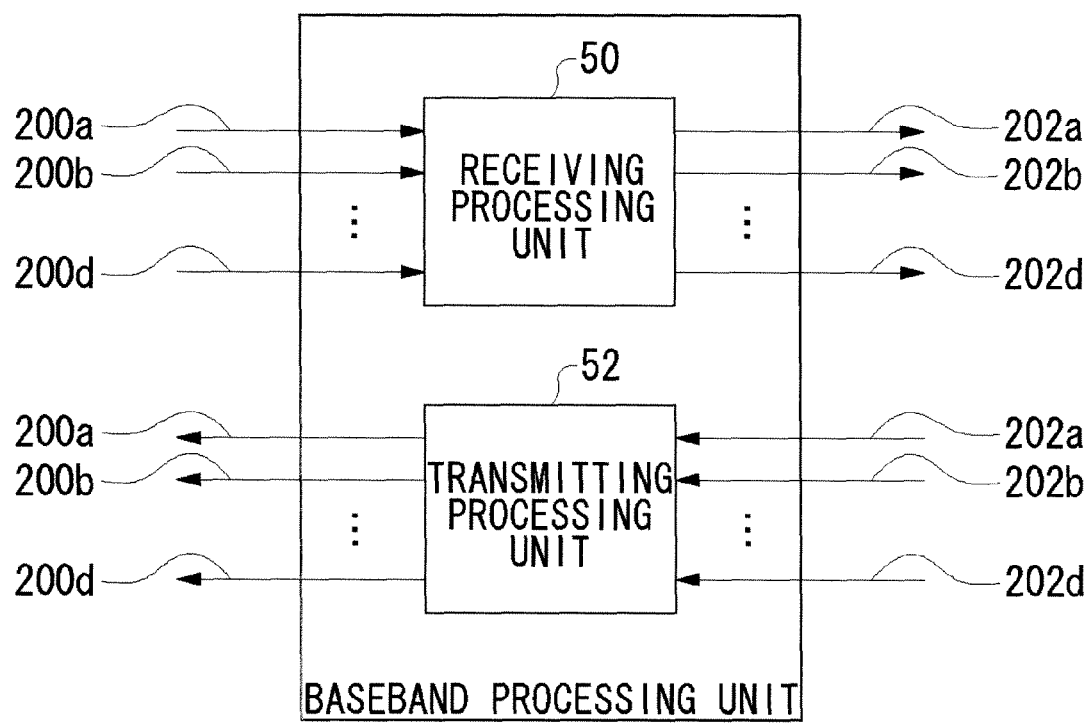
FIG. 10 illustrates a structure of a baseband processing unit shown in FIG. 7.

FIG. 10 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and therefore derives receiving weight vectors of the time-domain signals 200. Then the receiving processing unit 50 outputs the result of array synthesis as the frequency-domain signal 202. It is to be noted here that the receiving processing unit 50 may generate rate information based on the frequency-domain signals 202. As for the generation of rate information, a known technique serves the purpose as mentioned above and the explanation thereof is omitted here.

The transmitting processing unit 52 executes a part, corresponding to a transmission operation, of operations by the baseband processing unit 22. That is, the transmitting processing unit 52 converts the frequency-domain signal 202 so as to generate the time-domain signal 200. The transmitting processing unit 52 associates a plurality of streams with a plurality of antennas 12, respectively. The transmitting processing unit 52 applies CDD as shown in FIGS. 3A to 3C, FIGS. 4A to 4D and FIGS. 5A to 5D. The transmitting processing unit 52 may execute an operation using a steering matrix, as shown in FIG. 6. The transmitting processing unit 52 outputs finally the time-domain signals 200.

Figure 11:
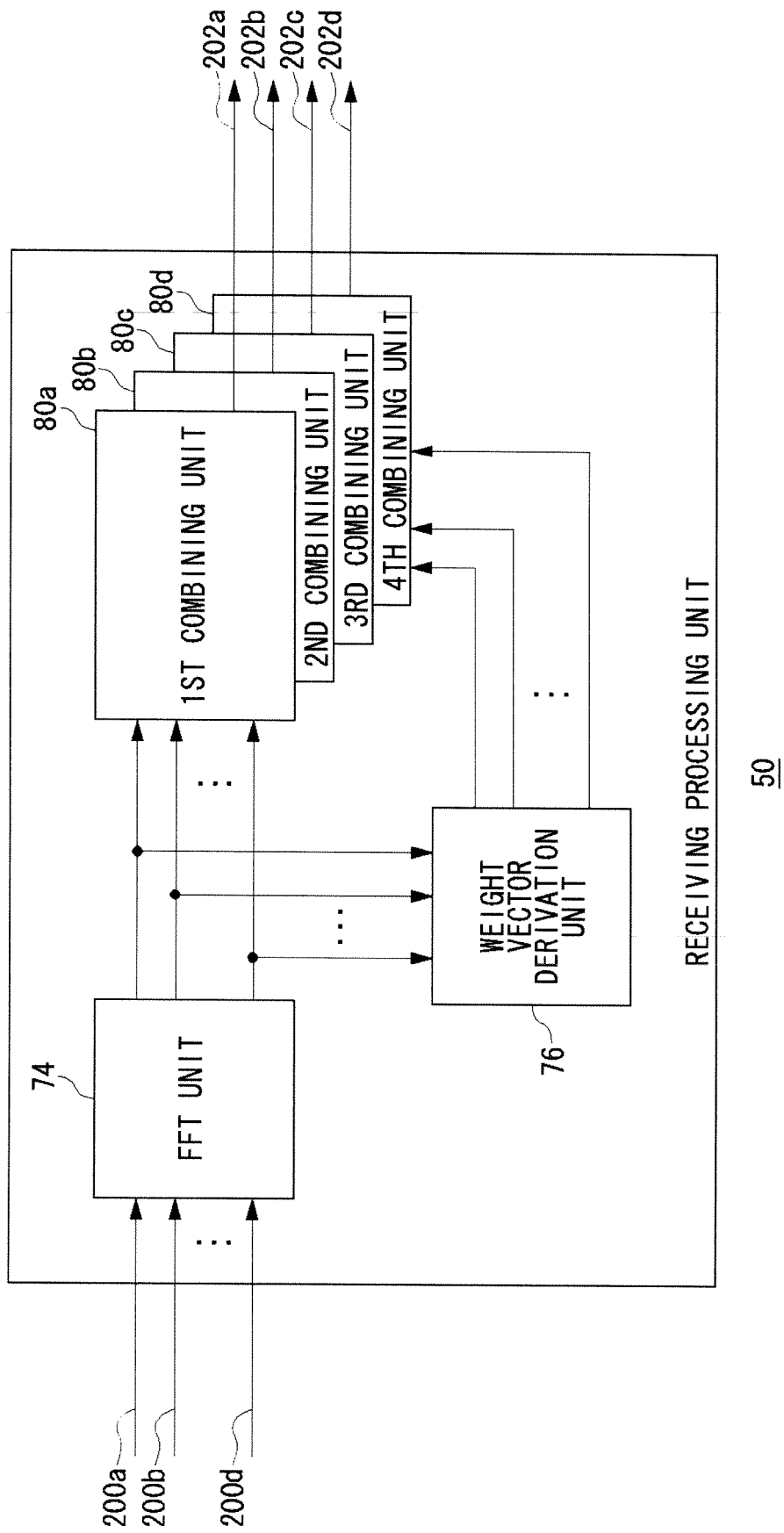
FIG. 11 illustrates a structure of a receiving processing unit shown in FIG. 10.

FIG. 11 illustrates a structure of the receiving processing unit 50. The receiving processing unit 50 includes an FFT unit 74, a weight vector derivation unit 76, and a first combining unit 80a, a second combining unit 80b, a third combining unit 80c and a fourth combining unit 80d, which are generically referred to as "combining unit 80".

The FFT unit 74 performs FFT on the time-domain signal 200 so as to convert the time-domain signal 200 into a frequency-domain value. It is assumed here that the frequency-domain value is structured as shown in FIG. 8. That is, a frequency-domain value for one time-domain signal 200 is outputted via one signal line.

The weight vector derivation unit 76 derives a weight vector from a frequency-domain value, on a subcarrier-by-subcarrier basis. The weight vector is so derived as to correspond to each of a plurality of streams, and a weight vector for one stream contains factors corresponding to the number of antennas, for each stream. To derive the weight vector, an adaptive algorithm may be used or channel characteristics may be used. Since a known technique may be employed in the processing of these, the explanation thereof is omitted here. When deriving the weight vector, the weight vector derivation unit 76 executes an operation of the first component minus (−) the second component plus (+) the third component minus (−) the fourth component, an operation of the first component plus (+) the second component or the like, as described earlier. As also described above, the weights are derived finally for each of subcarriers, antennas 12 and streams, respectively.

The combining unit 80 combines the frequency-domain value converted by the FFT unit 74 and the weight vector from the weight vector derivation unit 76. For example, as the weight vector to which a multiplication is to be executed, a weight which corresponds to both one subcarrier and the first stream is selected from among the weight vectors from the weight vector derivation unit 76. The selected weight has a value corresponding to each antenna 12.

As another weight vector to which a multiplication is to be executed, a value corresponding to one subcarrier is selected from among the frequency-domain values converted by the FFT unit 74. The selected value contains a value corresponding to each antenna 12. Note that both the selected weight and the selected value belong to the same subcarrier. While being associated respectively with the antennas 12, the selected weight and the selected value are respectively multiplied and the multiplication results are summed up. As a result, a value corresponding to one subcarrier in the first stream is derived. In the first combining unit 80a, the above-described processing is performed on the other subcarriers so as to derive data corresponding to the first stream. The similar processing is carried out to derive data corresponding respectively to the second to fourth streams. The derived first to fourth streams are outputted as the first frequency-domain signal 202a to the fourth frequency-domain signal 202d, respectively.

Figure 12:
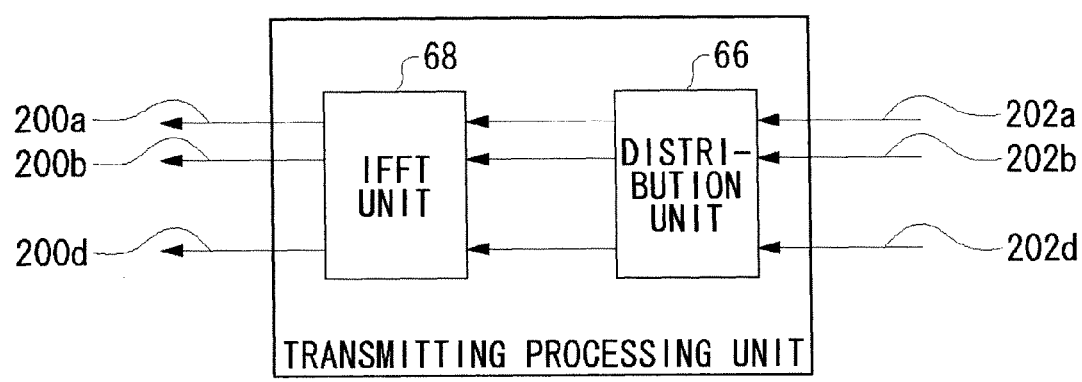
FIG. 12 illustrates a structure of a transmitting processing unit shown in FIG. 10.

FIG. 12 illustrates a structure of the transmitting processing unit 52. The transmitting processing unit 52 includes a distribution unit 66 and an IFFT unit 68. The distribution unit 66 associates the streams from the IFFT unit 68 with the antennas 12. To produce the packet signals corresponding to FIGS. 3A to 3C, FIGS. 4A to 4D and FIGS. 5A to 5D, the distribution unit 66 carries out CDD. CDD is expressed as a matrix C in the following Equation (1).

$$C(l) = \mathrm{diag}(1, \exp(-j2\pi l\delta/N\mathrm{out}), \ldots, \exp(-j2\pi l\delta(N\mathrm{out}-1)/N\mathrm{out})) \quad (1)$$

where δ indicates a shift amount and l a subcarrier number. The multiplication of the matrix C by a stream is done on a subcarrier-by-subcarrier basis. That is, the distribution unit 66 carries out a cyclic time shifting within the L-STF and so forth per stream. The amount of timing shift is so set, by following the above-described degree of priority, as to correspond to FIGS. 3A to 3C, FIGS. 4A to 4D and FIGS. 5A to 5D.

The distribution unit 66 may multiply respectively the training signals produced, as in FIGS. 4A to 4C and FIGS. 5A to 5D, by a steering matrix so as to increase the number of streams for training signal up to the number of a plurality of streams. Before carrying out multiplication, the distribution unit 66 extends the degree of inputted signals to the number of a plurality of streams. In the case of FIG. 4B and FIG. 5B, the number of signals inputted is "2" in "HT-STF" and the like assigned to the first and the second stream, and this will be represented by "Nin" here.

Accordingly, the inputted data are indicated by a vector of "Nin×1". The number of a plurality of streams is "4" and this is represented by "Nout" here. The distribution unit 66 extends the degree of inputted data to Nout from Nin. In other words, the vector of "Nin×1" is extended to the vector of "Nout×1". In so doing, "0" is inserted to components from the (Nin+1)th row to the Nout-th row. On the other hand, the component up to Nin are "0's" for "HT-LTF" assigned to the third and the fourth stream of FIG. 4B and FIG. 5B, and HT-LTF and the like are inserted to the components from (Nin+1)th row to the Nout-th row.

A steering matrix is expressed by the following Equation (2).

$$S(l)=C(l)W \qquad (2)$$

The steering matrix is a matrix of "Nout×Nout". W is an orthogonal matrix of "Nout×Nout". An example of the orthogonal matrices is a Walsh Matrix. Here, l is the subcarrier number, and the multiplication by a steering matrix is done on a subcarreri-by-subcarrier basis. C denotes CDD as described above. Here, the amounts of timing shift are so defined as to differ for a plurality of streams, respectively. That is, the amounts of timing shift for the first to the fourth stream are defined to be, for example, "0 ns", "−50 ns" "−100 ns" and "−150 ns", respectively.

Here a description will be made of modifications to the present embodiments. Problems to be solved for a first modification are as follows. As shown in FIG. 9, after assigning the transmit timings, the control unit 30 assigns timings for receiving. In the transmitting timing period, a plurality of respective terminal apparatuses receive training signals. In the case when the receiving is successful, the terminal apparatus generates an ACK signal and at the same time generates rate information based on the training signals and then transmits the rate information and the ACK signal to the base station apparatus at specified timings. Here, the specified timings are contained in the receiving timing period and are continuously assigned to a plurality of respective terminal apparatuses. Under such circumstances, even if the terminal apparatus succeeds in the receiving, the terminal apparatus can not receive the rate information or ACK signal unless the rate information or ACK signal can be generated in time for the specified timing. As a result, delay is caused in transmitting the rate information or ACK signal, thereby causing delay in the subsequent processings in the base station apparatus.

In order to solve such a problem, a base station apparatus according to a modification executes the following processing. Assume that the processing speed of a plurality of terminal apparatuses is not the same in general and the plurality of terminal apparatuses have a variety of processing speeds. The base station apparatus identifies the processing speeds of the plurality of terminal apparatuses, respectively. When specifying the timings at which the terminal apparatuses are to transmit packet signals, the base station apparatus sets the timings for the plurality of terminal apparatuses in a manner such that the timing for a terminal apparatus having faster speed is set earlier. As a result, slower the processing speed, the period of time from when a terminal apparatus receives training signal until it transmits the rate information and the like is longer. Hence, the probability that the rate information and the like cannot be transmitted can be reduced.

Figure 13:
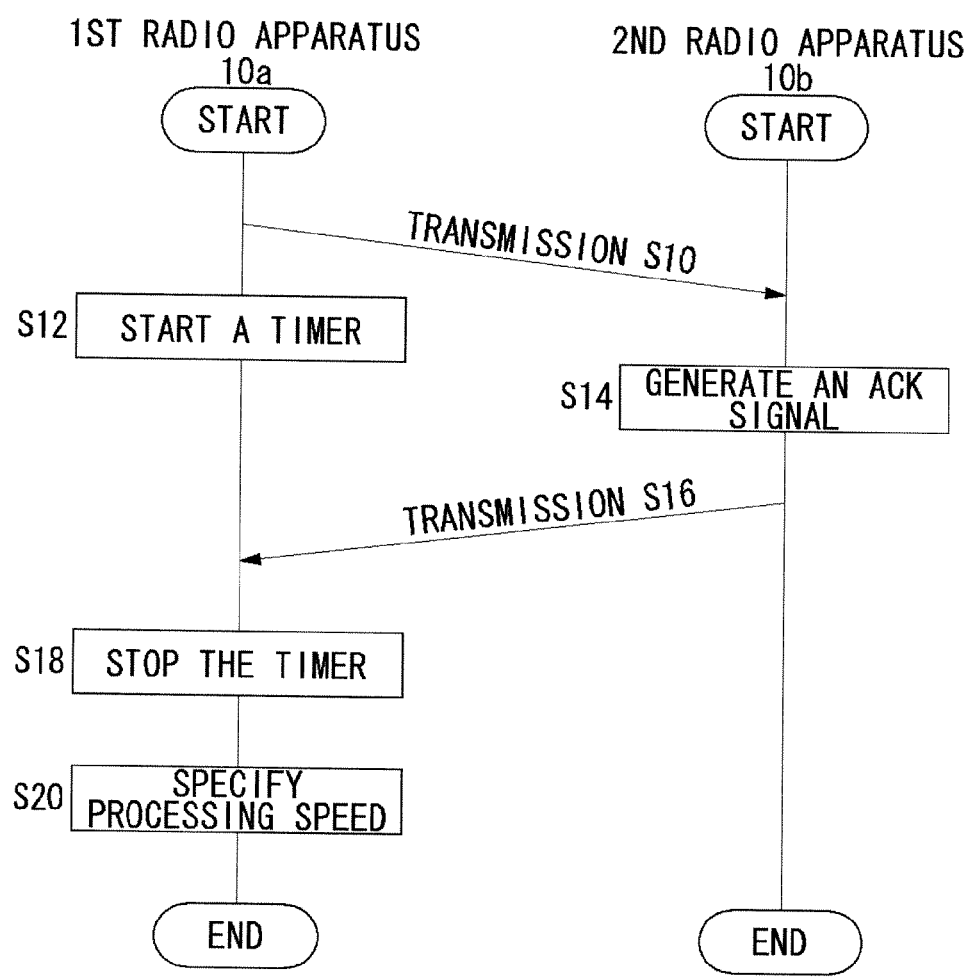
FIG. 13 is a sequence diagram showing a procedure for specifying a processing speed in a communication system of FIG. 2.

The structure of the modification to the communication system 100 is of the same type as the communication system 100 shown in FIG. 7. The control unit 30 identifies processing speeds for a plurality of respective terminal apparatuses. More specifically, the control unit 30 transmits packet signals to a plurality of terminal apparatuses via the radio unit 20 and the like, and measures respectively the time periods from when they are transmitted until when ACK signals to said signals are received. The control unit 30 identifies the processing speeds based on the thus measured time periods. As mentioned earlier, in a plurality of partial periods the control unit 30 assigns partial periods provided for transmitting the training signals, namely the transmitting timing periods, and then arranges contiguously partial periods provided for receiving the packet signals that contain the rate information and the like from a plurality of terminal apparatuses. That is, the control unit 30 arranges the receiving timing periods. The control unit 30 allocates the identified terminal apparatus, whose processing speed is faster, to an anterior partial period in the partial periods for receiving the packet signals. Processing speeds for a plurality of respective terminal apparatuses may be identified according to the period of time from when a base station apparatus transmits training signal until it receives the rate information FIG. 13 is a sequence diagram showing a procedure for identifying a processing speed in a communication system 100. The first radio apparatus 10a transmits packet signals to the second radio apparatus 10b (S10) and, at the same time, starts a timer (S12). Upon receipt of the packet signals, the second radio apparatus 10b generates an ACK signal (S14). The second radio apparatus 10b transmits the ACK signal to the first radio apparatus 10a (S16). Upon receipt of the ACK signal, the first radio apparatus 10a stops the timer (S18) and thereby measures the time period from when the packet signals are transmitted until when the ACK signal is received. Based on the measured time period, the first radio apparatus 10a identifies the processing speed (S20). The above processing is performed not only on the second radio apparatus 10b but also on the third radio apparatus 10c and so forth.

Figure 14:
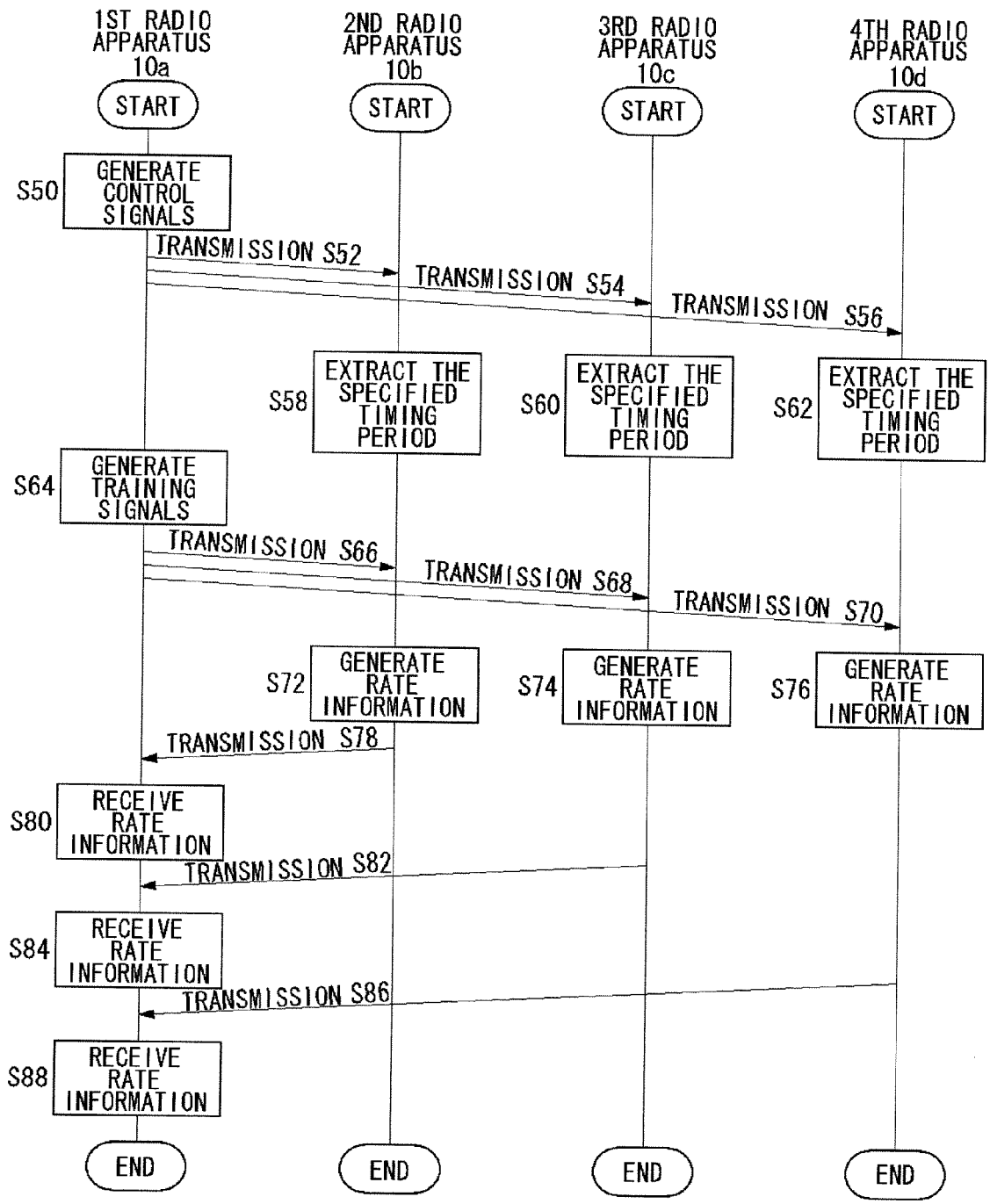
FIG. 14 is a sequence diagram showing a processing procedure in a communication system of FIG. 2.

FIG. 14 is a sequence diagram showing a processing procedure in a communication system 100. Assume here that the processing speed is high in the descending order of the second radio apparatus 10b, the third radio apparatus 10c and the fourth radio apparatus 10d. The first radio apparatus 10a generates control signals (S50). The first radio apparatus 10a transmits the control signals to the second radio apparatus 10b to the fourth radio apparatus 10d (S52, S54, S56). Assume here that the first radio apparatus 10a transmits one control signal. The second radio apparatus 10b to the fourth radio apparatus 10d respectively extracts from the control signal the timings specified by the first radio apparatus 10a (S58, S60, S62). The first radio apparatus 10a generates training signals (S64).

The first radio apparatus 10a transmits the training signals to the second radio apparatus 10b to the fourth radio apparatus 10d (S66, S68, S70). Assume here that the first radio apparatus 10a transmits one training signal. The second radio apparatus 10b to the fourth radio apparatus 10d respectively generate rate information from the training signals (S72, S74, S76). The second radio apparatus 10b transmits the rate information to the first radio apparatus 10a (S78), and the first radio apparatus 10a receives the rate information (S80). The third radio apparatus 10c transmits the rate information to the first radio apparatus 10a (S82), and the first radio apparatus 10a receives the rate information (S84). The fourth radio apparatus 10d transmits the rate information to the first radio apparatus 10a (S86), and the first radio apparatus 10a receives the rate information (S88).

A second modification may be combined with the present embodiments or the first modification. Thus far, the first radio apparatus 10a transmits training signals in the transmitting timing period. As shown in FIGS. 4A to 4D and FIGS. 5A to 5D, data are contained in the training signals. On the other hand, in a case when IP packets and the like are contained in the data, the maximum amount of data is defined and therefore the training signal containing data exceeding this maximum amount of data cannot be transmitted. However, there is demand that a large amount of data be transmitted in the assignment mode.

In order to solve such a problem, the second modification executes the following processing. Similar to the above, as the assignment mode the control unit 30 performs the allocation in the order of a controlling timing period, a transmitting timing period and a receiving timing period. In this modification, in the transmitting timing period the packet signals are assigned posterior to the training signals. That is, the control unit 30 transmits the training signals via the radio unit 20 and the like, and then transmits packet signals that contain data for at least one of a plurality of terminal apparatuses. Accordingly, data are contained in the packet signal, thus increasing the amount of data that the base station apparatus can transmit. Since the terminal apparatus receives the training signals and then receives the packet signals, the period of time from the timing at which the training signal is received until the specified timing is made longer. Thus, the generation of rate information by the specified time period is facilitated even for a terminal apparatus whose processing speed is low.

Figure 15:
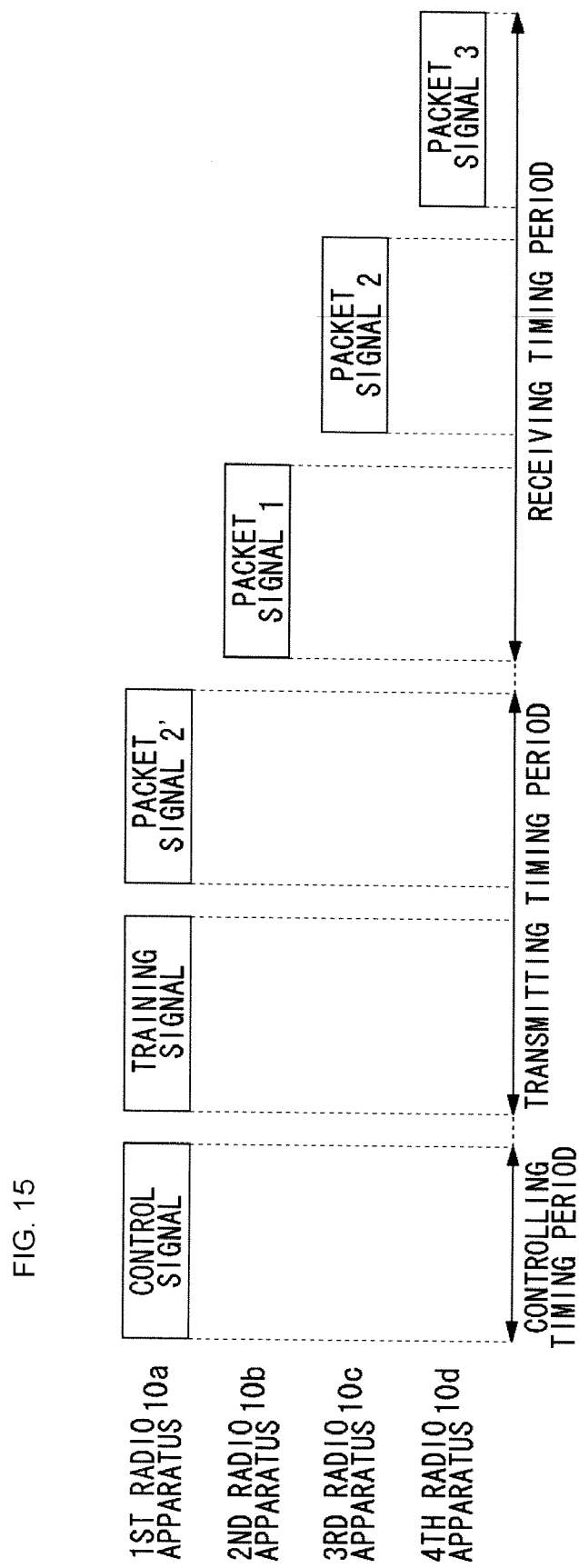
FIG. 15 illustrates a general outline of another timing assignment in a control unit shown in FIG. 7.

FIG. 15 illustrates a general outline of another timing assignment in a control unit 30. FIG. 15 is illustrated in a similar manner to FIG. 9. However, in the transmitting timing period the first radio apparatus 10*a* transmits "packet signal 2'" after the training signal. Here, the "packet signal 2'" is a packet signal to be transmitted to the third radio apparatus 10*c*. Note that two or more packet signals may be assigned after the training signal. With this assignment, the period of time from when a terminal apparatus receives the training signal until when it transmits the packet signals can be made longer.

A third modification may be combined with the present embodiments or the first modification. In the second modification, each packet signal transmitted from the base station apparatus contains data on each terminal apparatus. That is, data for a plurality of terminal apparatuses are transmitted by a plurality of packet signals. In the third modification, data for a plurality of terminal apparatuses are contained in one packet signal. Accordingly, it is assumed here that information on destination and the like are also contained in the packet signal as necessary. In the case where the data multiplexing is carried out in an upper layer as described above, the modem unit 24 performs modulation on multiple data which are to be contained in one packet signal, using the same modulation scheme. In such a case, the rate information for the plurality of data contained in the packet signal does not match with the packet signal, so that the adaptive modulation cannot be executed.

In order to solve such a problem, the third modification executes the following processing. Based on the rate information received via the radio unit 20 and like, the control unit 30 determines a communication rate which shall be used commonly by a plurality of terminal apparatuses. More specifically, the lowest communication rate is selected from the rate information for the multiple data contained in one packet signal. The control unit 30 coveys to the IF unit 26 and the modem unit 24 the thus selected communication rate as the communication rate which shall be used commonly thereby. When generating packet signals that contain data for a plurality of respective terminal apparatuses, the IF unit 26 and the modem unit 24 use the communication rate notified from the control unit 30, as the communication rate of said packet signals. In this manner, the rate information for a plurality of data contained in the packet signals is associated with the packet signals, so that the adaptive modulation can be executed. Since the lowest communication rate is selected, it is highly probable that data are transmitted accurately to a plurality of terminal apparatuses.

Figure 16:
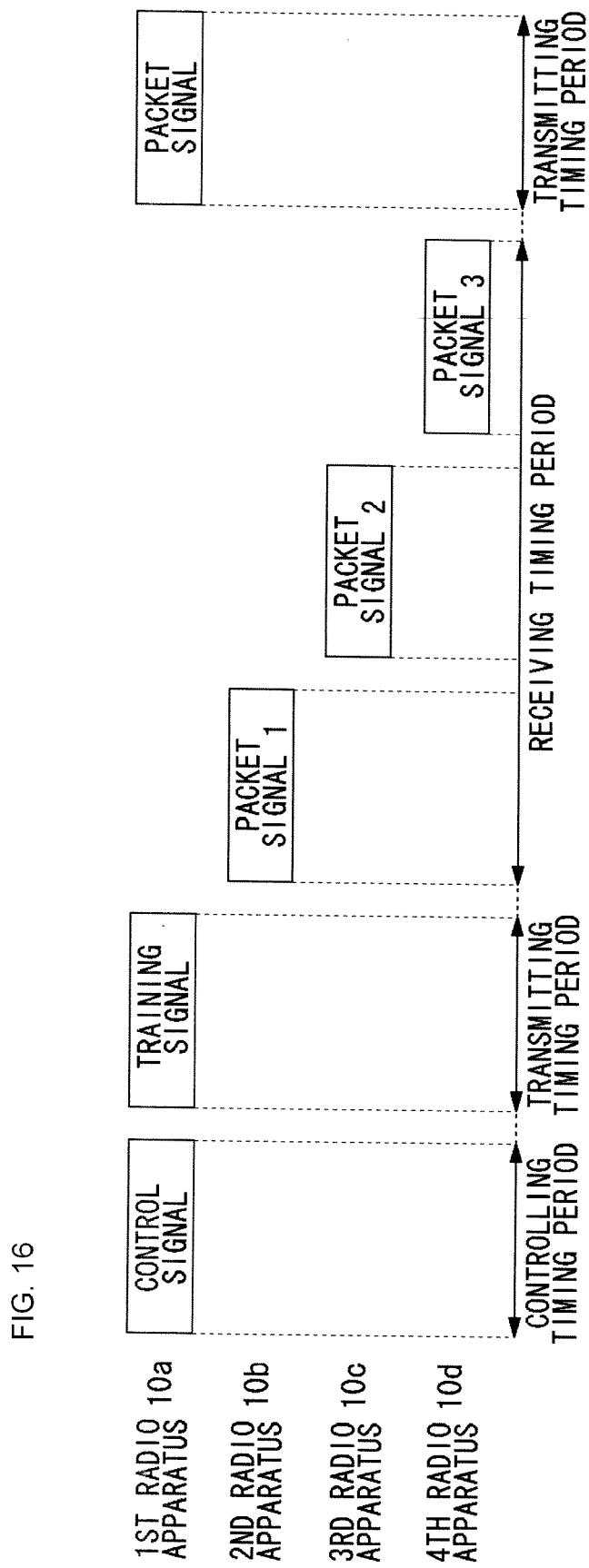
FIG. 16 illustrates a general outline of still another timing assignment in a control unit shown in FIG. 7.

FIG. 16 illustrates a general outline of still another timing assignment in the control unit 30. FIG. 16 is illustrated in a similar manner to FIG. 9. However, the first radio apparatus 10*a* further places a transmitting timing period posterior to the receiving timing period, and transmits a packet signal in this transmitting timing period. This packet signal contains data to be transmitted to the second radio apparatus 10*b* to the fourth radio apparatus 10*d*. In a transmitting timing period, the second radio apparatus 10*b* to the fourth radio apparatus 10*d* respectively receive the training signals transmitted from the first radio apparatus 10*a* and generate rate information. The second radio apparatus 10*b* has the rate information contained in "packet signal 1" in a receiving timing period and then transmits the "packet signal 1" to the first radio apparatus 10*a*. The third radio apparatus 10*c* has the rate information contained in "packet signal 2" in a receiving timing period and then transmits the "packet signal 2" to the first radio apparatus 10*a*. The fourth radio apparatus 10*d* has the rate information contained in "packet signal 3" in a receiving timing period and then transmits the "packet signal 3" to the first radio apparatus 10*a*.

The first radio apparatus 10*a* selects the lowest data rate from among data rates contained in the rate information on the second radio apparatus 10*b* to the fourth radio apparatus 10*d*. The first radio apparatus 10*a* aggregates data to be transmitted to the second radio apparatus 10*b* and the third radio apparatus 10*c* and generates a single packet signal. That is, the first radio apparatus 10*a* gathers up and aggregates the data for a plurality of terminal apparatuses into a single packet signal. The first radio apparatus 10*a* transmits the thus generated packet signal at a transmitting timing. In so doing, the first radio apparatus 10*a* sets the selected data rate. If the destinations of data contained in the packet signal are the second radio apparatus 10*b* and the third radio apparatus 10*c* only, the first radio apparatus 10*a* may determine the data rate based on the rate information from the second radio apparatus 10*b* and the third radio apparatus 10*c*.

Figure 17:
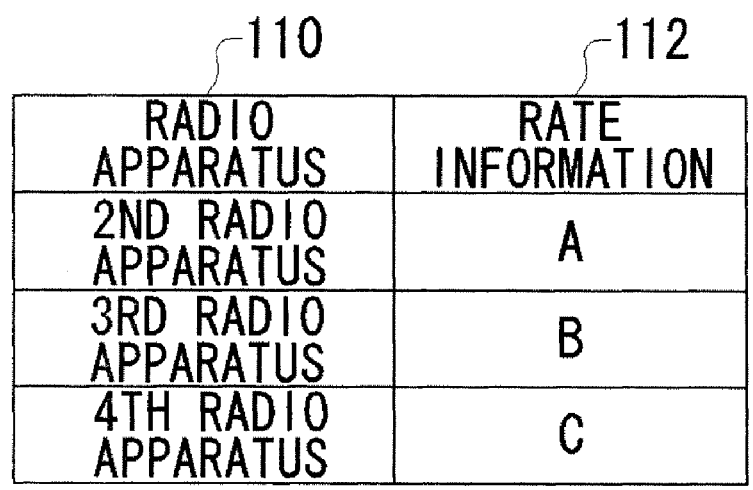
FIG. 17 illustrates a data structure of rate information stored in a control unit shown in FIG. 7.

FIG. 17 illustrates a data structure of rate information stored in the control unit 30. Referring to FIG. 17, there are provided a radio apparatus space 110 and a rate information space 112, and data rates "A" to "C" on the radio apparatuses 10 listed in the radio apparatus space 110 are stored therein. The control unit 30 selects the lowest value from among "A" and "B" and "C".

According to this embodiment, the training signals for a plurality of respective terminal apparatuses are generated as a single packet signal, so that the transmission efficiency can be enhanced in comparison with when a plurality of training signals are transmitted. Also, a signal indicating a request for rate information is contained in the packet signal, so that transmission of rate information can be instructed to the terminal apparatuses. Also, even in the case where the transmit timings at which training signals are to be transmitted are assigned to separate regions, the values of transmit timings are set to an identical value. Hence, the training signals can be produced as one packet signal.

Also, difference of the strength between HT-STF and HT-LTF becomes smaller, so that the gain derived for HT-STF can be brought close to a value suitable for HT-LTF. Since the gain derived for HT-STF can be brought close to a value suitable for HT-LTF, the accuracy of channel estimation based on HT-LTFs can be enhanced. Since the accuracy of channel estimation is enhanced, the accuracy of rate information can be improved.

When the training signals are produced, the number of streams to which HT-STF is assigned is set identical to the number of streams to which data is assigned. As a result, the gain set by HT-STF corresponds to data and therefore the deterioration of data receiving characteristics can be suppressed. Also, more of the same timing shift amounts can be used by defining the degrees of priority for the timing shift amounts and using the timing shift amounts in order from one with the highest degree of priority for a plurality of group of streams. Moreover, the processing may be made simpler by using more of the same timing shift amounts. Further, when the number of multiple streams is "2" and the number of streams to which data is assigned is "1", a receiving apparatus may instruct a transmitting apparatus which of the multiple streams is to have data assigned, according to the receiving condition of HT-LTF. In other words, it is possible to execute transmission diversity.

Since the timing shift amounts for the respective HT-LTFs assigned to a plurality of streams are of the same values, a receiving apparatus can cope easily when there are changes in streams to which data were assigned. Since different timing shift amounts are set for a plurality of streams, respectively, the processing can be carried out uniformly. Moreover, such a uniformly performed processing makes the processing simpler. Even when the number of streams where data is assigned increases in the subsequent packet signal, the HT-LTF for the stream to have the increase thereof has already been transmitted with the same timing shift amount. Thus, the receiving apparatus can use the already derived timing and the like. Since the receiving apparatus can use the already derived timing and the like, the receiving apparatus can easily cope with the increase in the number of streams where data is assigned.

Since a terminal apparatus whose processing speed is high is assigned anterior to the receiving timing, the period of time until when a terminal whose processing speed is low is to transmit the packet signals can be made longer. Since the period of time until when the packet signal is to be transmitted can be made longer, the rate information or ACK signal can be generated in time for the transmission thereof. Since the rate information or ACK signal can be generated in time for the transmission, the number of transmissions can be reduced and therefore the transmission efficiency can be enhanced. Since the processing speed is measured, the processing speed can be identified even if no signal is defined for conveying the processing speed. Since the packet signals are assigned following the training signals, the packet signals can be transmitted separately. A large amount of data can be transmitted. Even if the data for a plurality of terminal apparatuses are contained in a single packet signal, the adaptive modulation for this packet signal can be executed. Since the adaptive modulation is executed, a data rate suitable for a radio channel can be set.

The present invention has been described based on the embodiments. These embodiments are merely exemplary, and it is understood by those skilled in the art that various modifications to the combination of each component and each process thereof are possible and that such modifications are also within the scope of the present invention.

According to the embodiments of the present invention, the description has been given of a case when the number of streams is "4". However, this should not be considered as limiting and, for example, the number of a plurality of streams may be less than "4" or may be greater than "4". Along with this example, the number of antennas 12 may be less than "4" in the former case and may be greater than 4". In such cases, the number of streams contained in one group may be greater than "2", or the number of groups may be greater than "2". According to this modification, the present invention can be applied to a variety of the number of streams.

In the present embodiments, a matrix where the orthogonality holds among components is shown representing the relation among codes of "HT-LTFs" in the training signals. However, this should not be considered as limiting and, for example, instead of components being orthogonal to each other, it suffices if a matrix has a code relation such that each desired component can be retrieved by a simple calculation like addition and/or subtraction. According to this modification, various sign relations can be used as a code relation of "HT-LTFs" in the training signals.

In the present embodiments, the control unit 30 measures the processing speed of a terminal apparatus. This should not be considered as liming and, for example, the control unit 30 may receive information on processing speeds from a plurality of terminal apparatuses, respectively. Accordingly, the terminal apparatuses transmit information on processing speeds before the start of the assignment mode or immediately after the start thereof. Based on the received information, the control unit 30 identifies the processing speeds. According to this modification, the control unit 30 receives the information on the processing speeds, so that the processing speeds can be identified accurately.

In the present embodiments, the control unit 30 identifies the processing speeds for a plurality of respective terminal apparatuses and assigns the timings in a manner such that the transmitting timing whose processing speed is high is placed earlier. However, this should not be considered as limiting and, for example, the control unit 30 may identify the device class for a plurality of respective terminal apparatuses. The device class includes a hand-held device and a personal computer (PC). The control unit 30 may assign the timings so that the timing for a PC is placed earlier. Of a plurality of terminal apparatuses, the control unit 30 may identify terminal apparatuses in which "null" or "default" is contained in the rate information received in the past. The control unit 30 may assign the timings so that the transmitting timings for the thus identified terminal apparatuses are placed earlier. According to this modification, the timings can be assigned in accordance with various factors.

While the preferred embodiments of the present invention have been described using specific terms, such description is for illustrative purposes only, and it is to be understood that changes and variations may be made without departing from the spirit or scope of the appended claims.

What is claimed is:

1. A method for communicating with a plurality of terminal apparatuses by using a packet signal composed of at least one stream, the method comprising:

dividing a specified period into a plurality of partial periods and assigning the plurality of partial periods respectively to the plurality of terminal apparatuses by associating the periods with the terminal apparatuses;

generating a control packet signal containing information on the partial periods assigned to the plurality of respective terminal apparatuses and generating check packet signals for which a known signal is assigned to a stream whose number is greater than the number of streams to which data signal is assigned;

transmitting the check packet signals in the partial period assigned, after the control packet signal generated has been transmitted; and receiving packet signals containing check results from the plurality of respective terminal apparatuses, in the plurality of respective partial periods assigned, wherein said generating of a control packet signal includes generating the check packet signals for the plurality of respective terminal apparatuses, as a single packet signal.

* * * * *